(12) United States Patent
Ho et al.

(10) Patent No.: US 10,150,858 B2
(45) Date of Patent: Dec. 11, 2018

(54) BLENDED COMPOSITIONS, METHODS FOR MAKING SAME, AND ARTICLES MADE THEREFROM

(71) Applicant: Flint Hills Resources, LP, Wichita, KS (US)

(72) Inventors: Thoi H. Ho, Longview, TX (US); Pierre Donaldson, Longview, TX (US); Billy R. Bodiford, White Oak, TX (US); Steve Hooker, Longview, TX (US); Mark Wolverton, Aurora, IL (US)

(73) Assignee: Flint Hills Resources, LP, Wichita, KS (US)

( * ) Notice: Subject to any disclaimer, the term of this patent is extended or adjusted under 35 U.S.C. 154(b) by 0 days.

(21) Appl. No.: 15/117,925

(22) PCT Filed: Feb. 11, 2015

(86) PCT No.: PCT/US2015/015468
§ 371 (c)(1),
(2) Date: Aug. 10, 2016

(87) PCT Pub. No.: WO2015/123334
PCT Pub. Date: Aug. 20, 2015

(65) Prior Publication Data
US 2016/0347945 A1    Dec. 1, 2016

Related U.S. Application Data

(60) Provisional application No. 61/938,580, filed on Feb. 11, 2014.

(51) Int. Cl.
| | | |
|---|---|---|
| *C08L 23/12* | (2006.01) | |
| *C08L 23/14* | (2006.01) | |
| *C08L 23/16* | (2006.01) | |
| *C08J 3/00* | (2006.01) | |

(52) U.S. Cl.
CPC .............. *C08L 23/16* (2013.01); *C08J 3/005* (2013.01); *C08L 23/12* (2013.01); *C08L 23/142* (2013.01); *C08J 2323/16* (2013.01); *C08J 2423/12* (2013.01)

(58) Field of Classification Search
CPC ......... C08L 23/12; C08L 23/142; C08L 97/02
See application file for complete search history.

(56) References Cited

U.S. PATENT DOCUMENTS

| | | | |
|---|---|---|---|
| 3,988,270 A | 10/1976 | Willis, Jr. et al. | |
| 4,472,545 A | 9/1984 | Coughlin et al. | |
| 4,687,793 A | 8/1987 | Motegi et al. | |
| 4,746,688 A | 5/1988 | Bistak et al. | |
| 4,761,451 A | 8/1988 | Moteki et al. | |
| 5,416,139 A * | 5/1995 | Zeiszler .................. C08L 99/00 524/13 |
| 6,040,348 A * | 3/2000 | Delaite ................... C08J 9/0061 521/134 |
| 6,172,144 B1 | 1/2001 | Yekani | |
| 6,265,037 B1 * | 7/2001 | Godavarti ........... B29C 47/0004 428/297.4 |
| 6,268,063 B1 | 7/2001 | Kaminaka | |
| 6,280,667 B1 * | 8/2001 | Koenig .................. B27N 3/002 264/102 |
| 6,942,829 B2 | 9/2005 | Drabeck, Jr. et al. | |
| 2003/0153689 A1 * | 8/2003 | Mehta ..................... C08F 10/00 525/240 |
| 2005/0009960 A1 * | 1/2005 | Ton-That .............. C08F 255/00 524/27 |
| 2005/0027080 A1 * | 2/2005 | Bodiford ............. B29C 45/0001 525/331.7 |
| 2005/0187315 A1 * | 8/2005 | Dean ...................... C08L 23/02 524/17 |
| 2006/0135699 A1 * | 6/2006 | Li ........................... C08L 23/10 525/240 |
| 2006/0183860 A1 * | 8/2006 | Mehta ..................... C08L 23/10 525/191 |

(Continued)

FOREIGN PATENT DOCUMENTS

EP    2551299 A1 *    1/2013    .............. C08L 23/10

OTHER PUBLICATIONS

Sharma (Mechanical Behaviour, Water Absorption and Morphology of Wheat Straw, Talc, Mica and Wollastonite filled Polypropylene Composites, 2012).*
Yang et al. (Composite Structure 63, 2004, 305-312).*
Bledzki et al. (Composites: Part A, 41, 2010, 480-488).*
PCT/US2015/015468, International Search Report and Written Opinion dated Apr. 29, 2015.
Abstract of Toro, Patricia et al. 'Study of the morphology and mechanical properties of polypropylene composites with silica or rice-husk.' Polymer International. 2005, vol. 54, No. 4, pp. 730-734.
Abstract of Siriwardena, S. et al. 'White rice husk ash filled ethylene-propylene-diene terpolymer/polypropylene blends: Effect of dynamic vulcanization and filler loading.' Polymer-Plastics Technology and Engineering. 2001, vol. 40, No. 4, pp. 519-538.

(Continued)

Primary Examiner — Liam J Heincer

(57) ABSTRACT

Blended compositions that can include one or more thermoplastic polymers and one or more organic fillers and methods for making and using same. The blended composition can have a Notched Izod Impact Strength of at least 20 J/m to about 600 J/m, measured according to ASTM D256-10, and a melt index of about 1 g/10 min to about 100 g/10 min, measured according to ASTM D1238-13, procedure B. The thermoplastic copolymer can include a blend of a polypropylene homopolymer and a copolymer of propylene and a comonomer. The comonomer can include ethylene, a $C_4$ to $C_{20}$ olefin, or any mixture thereof. The copolymer of propylene and the comonomer can include about 0.5 wt % to about 40 wt % of the comonomer. The blended composition can include about 5 wt % to about 30 wt % of the organic filler based on the combined weight of the thermoplastic copolymer and the organic filler.

20 Claims, No Drawings

(56) References Cited

U.S. PATENT DOCUMENTS

| | | | |
|---|---|---|---|
| 2006/0281868 A1* | 12/2006 | Sudhin | C08L 23/08 525/240 |
| 2007/0066758 A1* | 3/2007 | McArdle | C08L 23/0853 525/240 |
| 2007/0079825 A1* | 4/2007 | Sera | C09K 5/063 126/620 |
| 2007/0202285 A1* | 8/2007 | Burmaster | C08F 210/06 428/35.7 |
| 2007/0246862 A1* | 10/2007 | Jones | B29C 45/18 264/328.8 |
| 2009/0036566 A1 | 2/2009 | Li et al. | |
| 2009/0062413 A1* | 3/2009 | Adur | B29C 37/0032 521/157 |
| 2009/0298974 A1* | 12/2009 | Chmielewski | C08L 23/02 524/14 |
| 2009/0321981 A1* | 12/2009 | Hopkins | C08L 97/02 264/128 |
| 2011/0045250 A1 | 2/2011 | De Zen | |
| 2011/0151161 A1* | 6/2011 | Malm | C08F 10/06 428/36.9 |
| 2013/0023608 A1* | 1/2013 | Kellett | D01F 1/10 524/52 |
| 2013/0221575 A1* | 8/2013 | Altonen | B29C 45/77 264/328.14 |
| 2013/0330993 A1* | 12/2013 | Dwarshuis | B29B 17/0005 442/294 |
| 2014/0209841 A1* | 7/2014 | Taunk | C08L 3/02 252/511 |
| 2015/0044405 A1* | 2/2015 | Kaneno | C08J 9/0061 428/36.5 |
| 2015/0353718 A1* | 12/2015 | Weaver | C08L 23/142 524/232 |
| 2016/0200950 A1* | 7/2016 | Kalfus | C09J 123/16 442/327 |

OTHER PUBLICATIONS

Abstract of Jamil, Mohd Suzeren et al. 'Effects of rice husk filler on the mechanical and thermal properties of liquid natural rubber compatibilized high-density polyethylene/natural rubber blends.' Journal of Polymer Research. 2006, vol. 13, No. 4, pp. 315-321.

Duy Tran, Thanh et al. 'Study of mechanical properties of composite material based on polypropylene and vietnamese rice husk filler.' Journal of Chemistry. 2013, vol. 2013, Article ID 752924.

* cited by examiner

BLENDED COMPOSITIONS, METHODS FOR MAKING SAME, AND ARTICLES MADE THEREFROM

CROSS-REFERENCE TO RELATED APPLICATIONS

This is a National Stage Application under 35 U.S.C. § 371 of PCT/US2015/015468, filed on Feb. 11, 2015, and published as WO 2015/123334, which claims priority to U.S. Provisional patent application No. 61/938,580, filed on Feb. 11, 2014, which are both incorporated by reference herein.

BACKGROUND

Field

Embodiments described generally relate to blended compositions, methods for making same, and articles made therefrom. More particularly, the embodiments relate to blends of one or more thermoplastic copolymers and one or more organic fillers, methods for making same, and articles made therefrom.

Description of the Related Art

Fillers are often blended with polymers to produce polymer/filler blends to reduce costs while maintaining desired end product properties. One such filler is rice husks. Rice is one of the most abundant grains and rice husks produced during the milling of rice amount to about 20 wt % to about 25 wt % of the rice grain. The rice husks account for a large amount of waste that needs to be utilized or disposed. There are some low value applications for rice husk such as compost, litter, animal bedding, and filler for animal food, but the majority of rice husk waste is disposed of in landfills or burned.

Current attempts at blending rice husk as a filler with polymers has yielded products with insufficient mechanical properties. For example, rice husk and polypropylene blends generate undesirable odors, and more significantly, have a significant and unacceptable reduction in toughness.

There is a need, therefore, for improved blends of thermoplastic polymers and organic fillers, methods for making same, and articles made therefrom.

SUMMARY

Blended compositions that include one or more thermoplastic copolymers and one or more organic fillers, methods for making same, and articles made therefrom are provided. A blended composition can include a thermoplastic copolymer and an organic filler. The blended composition can have a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight). The thermoplastic copolymer can include a blend of a polypropylene homopolymer and a copolymer of propylene and a comonomer. The comonomer can include ethylene, a $C_4$ to $C_{20}$ olefin, or any mixture thereof. The copolymer of propylene and the comonomer can include about 0.5 wt % to about 40 wt % of the comonomer. The blended composition can include about 5 wt % to about 30 wt % of the organic filler based on the combined weight of the thermoplastic copolymer and the organic filler.

A method for making a blended composition can include blending a first thermoplastic copolymer with a concentrated blend to produce a blended composition. The blended composition can have a Notched Izod Impact Strength of at least 20 J/m to about 600 J/m, as measured according to ASTM D256-10. The blended composition can have a melt index of about 1 g/10 min to about 100 g/10 min, as measured according to ASTM D1238-13, procedure B (at 230° C. and 2.16 kg weight). The first thermoplastic copolymer can include a blend of a first polypropylene homopolymer and a first copolymer of propylene and a first comonomer. The first comonomer can include ethylene, a $C_4$ to $C_{20}$ olefin, or any mixture thereof. The first copolymer of propylene and the first comonomer can include about 0.5 wt % to about 40 wt % of the first comonomer. The concentrated blend can include (1) a second thermoplastic copolymer and greater than 30 wt % to about 55 wt % of an organic filler, based on the combined weight of the second thermoplastic copolymer and the organic filler, (2) a second polypropylene homopolymer and greater than 30 wt % to about 55 wt % of an organic filler, based on the combined weight of the second polypropylene homopolymer and the organic filler, or (3) a second thermoplastic copolymer, a second polypropylene homopolymer, and greater than 30 wt % to about 55 wt % of an organic filler, based on the combined weight of the second thermoplastic copolymer, the second polypropylene homopolymer, and the organic filler. The blended composition can include about 5 wt % to about 30 wt % of the organic filler, based on the combined weight of the first thermoplastic copolymer and the concentrated blend.

A concentrated blend can include a thermoplastic copolymer and an organic filler. The concentrated blend can have a Notched Izod Impact Strength of at least 10 J/m to about 300 J/m, as measured according to ASTM D256-10, and a melt index of about 5 g/10 min to about 100 g/10 min, as measured according to ASTM D1238-13, procedure B (at 230° C. and 2.16 kg weight). The thermoplastic copolymer can include (A) a blend of a polypropylene homopolymer and a first copolymer of propylene and a first comonomer or (B) a second copolymer of propylene and a second comonomer. The first comonomer can include ethylene, a $C_4$ to $C_{20}$ olefin, or any mixture thereof. The first copolymer can include about 0.5 wt % to about 40 wt % of the first comonomer. The second comonomer can include ethylene, a $C_4$ to $C_{20}$ olefin, or any mixture thereof. The second copolymer can include about 0.5 wt % to about 6 wt % of the second comonomer. The concentrated blend can include at least 30 wt % to about 55 wt % of the organic filler, based on the combined weight of the thermoplastic copolymer and the organic filler.

DETAILED DESCRIPTION

It has been surprisingly and unexpectedly discovered that one or more thermoplastic copolymers that can include a blend of one or more polypropylene homopolymers and one or more copolymers of propylene and about 0.5 wt % to about 40 wt % of one or more comonomers can be blended with one or more organic fillers to produce a blended composition having a Notched Izod Impact Strength of at least 20 J/m, as measured according to ASTM D256-10 at 23° C., and a melt index "MI" or "$I_2$" of at least 1 g/10 min, as measured according to ASTM D1238-13, procedure B (at 230° C. and 2.16 kg weight). It has also been surprisingly and unexpectedly discovered that controlling the processing temperature used to make the blended compositions and articles made therefrom can provide products having little to no offensive odor.

The amount of the organic filler in the blended composition can be from a low of about 1 wt %, about 5 wt %, about 7 wt %, about 10 wt %, about 12 wt %, or about 15 wt % to a high of about 17 wt %, about 20 wt %, about 23 wt %, about 25 wt %, about 27 wt %, or about 30 wt %, based on the combined weight of the thermoplastic copolymer and the organic filler. For example, the blended composition can include from about 5 wt % to about 30 wt %, about 8 wt % to about 12 wt %, about 10 wt % to about 18 wt %, about 14 wt % to about 24 wt %, about 16 wt % to about 28 wt %, or about 22 wt % to about 30 wt % of the organic filler, based on the combined weight of the thermoplastic copolymer and the organic filler. In another example, the amount of the organic filler in the blended composition can be at least 3 wt %, at least 5 wt %, or at least 7 wt % and less than 30 wt %, less than 25 wt %, less than 20 wt %, less than 15 wt %, or less than 10 wt % based on the combined weight of the thermoplastic copolymer and the organic filler.

The blended composition can have a Notched Izod Impact Strength or simply "Notched Izod" from a low of at least 20 J/m, at least 22 J/m, at least 24 J/m, at least 26 J/m, at least 26.7 J/m, about 27 J/m, about 30 J/m, about 35 J/m, about 40 J/m, or about 50 J/m to a high of about 75 J/m, about 100 J/m, about 150 J/m, about 200 J/m, about 300 J/m, about 400 J/m, about 500 J/m, or about 600 J/m. For example, the blended composition can have a Notched Izod of at least 27 J/m, at least 30 J/m, at least 35 J/m, at least 40 J/m, at least 45 J/m, at least 50 J/m, or at least 60 J/m and up to about 100 J/m, about 200 J/m, about 300 J/m, about 400 J/m, about 500 J/m, or about 600 J/m. In another example, the blended composition can have a Notched Izod of about 20 J/m to about 550 J/m, about 26.7 J/m to about 70 J/m, about 30 J/m to about 360 J/m, about 35 J/m to about 50 J/m, about 27 J/m to about 90 J/m, about 50 J/m to about 350 J/m, about 100 J/m to about 225 J/m, about 175 J/m to about 375 J/m, about 250 J/m to about 425 J/m, about 275 J/m to about 500 J/m, about 325 J/m to about 550 J/m, about 375 J/m to about 600 J/m, or about 450 J/m to about 600 J/m. In another example, the blended composition can have a Notched Izod of at least 30 J/m, at least 35 J/m, at least 40 J/m, at least 45 J/m, at least 50 J/m, at least 55 J/m, at least 60 J/m, at least 65 J/m, at least 70 J/m, at least 75 J/m, at least 80 J/m, at least 85 J/m, at least 90 J/m, at least 95 J/m, at least 100 J/m, at least 110 J/m, at least 120 J/m, at least 130 J/m, at least 140 J/m, or at least 150 J/m and up to about 200 J/m, about 250 J/m, about 300 J/m, about 350 J/m, about 400 J/m, about 450 J/m, about 500 J/m, about 550 J/m, or about 600 J/m. In at least one embodiment, the blended composition can have a no break Notched Izod. The Notched Izod of the blended composition, the thermoplastic copolymer, and other compositions discussed and described herein can be measured according to ASTM D256-10 at 23° C. It should be noted that generally a Notched Izod greater than about 450 to about 500 J/m is considered to be a "no break" Notched Izod value. As such, the thermoplastic copolymer can have a Notched Izod from a low of at least at least 20 J/m, at least 26.7 J/m, at least 30 J/m, at least 35 J/m, at least 40 J/m, at least 45 J/m, at least 50 J/m, at least 55 J/m, or at least 60 J/m to "no break."

The blended composition can have a melt index ($I_2$) from a low of about 0.7, about 0.8, about 0.9, about 1, about 1.5, about 2, about 2.5, about 3, about 3.5, about 4, about 4.5, about 5 g/10 min, about 6.5 g/10 min, about 7 g/10 min, about 7.5 g/10 min, about 8 g/10 min, about 8.5 g/10 min, about 9 g/10 min, about 9.5 g/10 min, about 10 g/10 min, about 12 g/10 min, about 14 g/10 min, or about 16 g/10 min to a high of about 40 g/10 min, about 43 g/10 in, about 46 g/10 min, about 49 g/10 min, about 53 g/10 min, about 55 g/10 min, about 60 g/10 min, about 63 g/10 min, about 67 g/10 min, about 70 g/10 min, about 75 g/10 min, about 80 g/10 min, about 85 g/10 min, about 90 g/10 min, about 95 g/10 min, about 100 g/10 min. For example, the blended composition can have a melt index ($I_2$) of about 5 g/10 min to about 70 g/10 min, about 8 g/10 to about 40 g/10 min, about 12 g/10 min to about 30 g/10 min, about 10 g/10 min to about 18 g/10 min, about 13 g/10 min to about 26 g/10 min, about 20 g/10 min to about 60 g/10 min, about 25 g/10 min to about 65 g/10 min, about 20 g/10 min to about 30 g/10 min, or about 12 g/10 min to about 28 g/10 min. In another example, the blended composition can have a melt index ($I_2$) of at least 1 g/10 min, at least 2 g/10 min, at least 3 g/10 min, at least 4 g/10 min, at least 5 g/10 min, at least 6 g/10 min, at least 7 g/10 min, at least 8 g/10 min, at least 9 g/10 min, at least 10 g/10 min, at least 11 g/10 min, at least 12 g/10 min, at least 13 g/10 min at least 14 g/10 min, at least 15 g/10 min, at least 16 g/10 min, at least 17 g/10 min, at least 18 g/10 min, at least 19 g/10 min, or at least 20 g/10 min and up to about 30 g/10 min, about 35 g/10 min, about 40 g/10 min, about 45 g/10 min, about 50 g/10 min, about 55 g/10 min, about 60 g/10 min, about 65 g/10 min, about 70 g/10 min, about 75 g/10 min, about 80 g/10 min, about 85 g/10 min, about 90 g/10 min, about 95 g/10 min, or about 100 g/10 min. In another example, the blended composition can have a melt index ($I_2$) of greater than 1, greater than 1.5, greater than 2, greater than 2.5, greater than 3, greater than 3.5, greater than 4, greater than 4.5, greater than 5 g/10 min, greater than 6.5 g/10 min, greater than 7 g/10 min, greater than 7.5 g/10 min, greater than 8 g/10 min, greater than 8.5 g/10 min, greater than 9 g/10 min, greater than 9.5 g/10 min, greater than 10 g/10 min, greater than 12 g/10 min, greater than 14 g/10 min, greater than 16 g/10 min, greater than 17 g/10 min, greater than 19 g/10 min, greater than 22 g/10 min, greater than 23 g/10 min, greater than 25 g/10 min, greater than 27 g/10 min, greater than 29 g/10 min, greater than 30 g/10 min, or greater than 33 g/10 min and up to about 40 g/10 min, about 43 g/10 in, about 46 g/10 min, about 49 g/10 min, about 53 g/10 min, about 55 g/10 min, about 60 g/10 min, about 63 g/10 min, about 67 g/10 min, about 70 g/10 min, about 75 g/10 min, about 80 g/10 min, about 85 g/10 min, about 90 g/10 min, about 95 g/10 min, or about 100 g/10 min. In another example, the blended composition can have a melt index ($I_2$) of about 1 g/10 min to about 3 g/10 min, about 0.7 g/10 min to about 1.3 g/10 min, about 1 g/10 min to about 5 g/10 min, about 2 g/10 min to about 6 g/10 min, or about 4 g/10 min to about 8 g/10 min. The melt index ($I_2$) of the blended composition, the thermoplastic copolymer, and other compositions discussed and described herein can be measured according to ASTM D1238-13, procedure B (at 230° C. and 2.16 kg weight).

The blended composition can have a tensile strength at yield in the machine direction from a low of about 16 MPa, about 17 MPa, about 18 MPa, about 19 MPa, or about 20 MPa to a high of about 22 MPa, about 24 MPa, about 26 MPa, about 28 MPa, or about 30 MPa. For example, the blended composition can have a tensile strength at yield in the machine direction of about 16.3 MPa to about 18.6 MPa, about 17.5 MPa to about 20.5 MPa, about 18.5 MPa to about 22.7 MPa, about 21.5 MPa to about 25.5 MPa, about 23 MPa to about 29 MPa, or about 25 MPa to about 30 MPa. In another example, the blended composition can have a tensile strength at yield in the machine direction of at least 16 MPa, at least 16.5 MPa, at least 17 MPa, at least 17.5 MPa, at least 18 MPa, at least 18.5 MPa, at least 19 MPa, at least 19.5 MPa, or at least 20 MPa and up to about 25 MPa, about 28 MPa, or about 30 MPa. The tensile strength at yield in the machine direction of the blended composition, the thermoplastic copolymer, and other compositions discussed and described herein can be measured according to ASTM D638-10.

The blended composition can have an elongation at yield in the machine direction from a low of about 2%, about 2.5%, about 3%, about 3.5%, or about 4%, to a high of about 6%, about 6.5%, about 7%, about 7.5%, or about 8%. For example, the blended composition can have an elongation at yield in the machine direction of about 2.5% to about 5.5%, about 2.3% to about 3.8%, about 3.1% to about 5.3%, about 4.3% to about 6.4%, about 5.1% to about 7.3%, or about 6.2% to about 7.8%. In another example, the blended composition can have an elongation at yield in the machine direction of at least 2.2%, at least 2.4%, at least 2.7%, or at least 3%, at least 3.3%, at least 3.5%, at least 3.7%, or at least 4% and up to about 5%, about 6%, about 7%, or about 8%. The elongation at yield in the machine direction of the blended composition, the thermoplastic copolymer, and other compositions discussed and described herein can be measured according to ASTM D638-10.

The blended composition can have a flexural modulus (tangent) from a low of about 700 MPa, about 800 MPa, or about 900 MPa to a high of about 1,300 MPa, about 1,500 MPa, about 1,700 MPa, or about 2,000 MPa. For example, the blended composition can have a flexural modulus (tangent) of about 750 MPa to about 1,950 MPa, about 800 MPa to about 1,250 MPa, about 850 MPa to about 1,400 MPa, about 975 MPa to about 1,300 MPa, about 1,200 MPa to about 1,600 MPa, or about 1,400 MPa to about 1,900 MPa. In another example the blended composition can have a flexural modulus (tangent) of at least 725 MPa, at least 750 MPa, at least 800 MPa, at least 850 MPa, or at least 900 MPa and up to about 1,400 MPa, about 1,700 MPa, or about 2,000 MPa. The flexural modulus (tangent) of the blended composition, the thermoplastic copolymer, and other compositions discussed and described herein can be measured according to ASTM D790-10, procedure A.

The blended composition can have a 1% Secant Modulus in the machine direction from a low of about 620 MPa, about 700 MPa, or about 800 MPa to a high of about 1,200 MPa, about 1,600 MPa, or about 1,920 MPa. For example, the blended composition can have a 1% Secant Modulus of about 620 MPa to about 1,850 MPa, about 700 MPa to about 1,100 MPa, about 850 MPa to about 1,400 MPa, about 950 MPa to about 1,600 MPa, about 1,050 MPa to about 1,700 MPa, or about 1,250 MPa to about 1,900 MPa. In another example, the blended composition can have a 1% Secant Modulus of at least 750 MPa, at least 800 MPa, at least 850 MPa, at least 900 MPa, at least 950 MPa, or at least 1,000 MPa and up to about 1,400 MPa, about 1,600 MPa, about 1,800 MPa, or about 1,900 MPa. The 1% Secant Modulus in the machine direction of the blended composition, the thermoplastic copolymer, and other compositions discussed and described herein can be measured according to ASTM D790-10, procedure A.

The blended composition can have a yellowness index (plaques) from a low of about 60, about 65, about 70, or about 75 to a high of about 85, about 90, about 95, about 100, or about 105. For example, the blended composition can have a yellowness index (plaques) of about 75 to about 95, about 80 to about 90, or about 85 to about 95. The blended composition can have a yellowness index (pellets) from a low of about 5, about 10, about 15, about 20, about 30, about 35, or about 40 to a high of about 55, about 60, about 70, about 80, about 90, or about 95. The yellowness index of the blended composition, the thermoplastic copolymer, and other compositions discussed and described herein, when in the form of pellets, can be measured according to ASTM D6290-13. The yellowness index of the blended composition, the thermoplastic copolymer, and other compositions discussed and described herein, when in the form of plaques, can be measured according to ASTM D1925-94(1988) (withdrawn in 1995).

The blended composition can have a percent gloss at 60° from a low of about 1, about 2, about 3, about 5, about 10, or about 15 to a high of about 40, about 50, about 60, or about 70. For example, the blended composition can have a percent gloss at 60° from about 1 to about 5, about 1 to about 2.9, about 5 to about 30, about 15 to about 55, about 25 to about 65, about 40 to about 65, or about 20 to about 45. In another example, the blended composition can have a percent gloss at 60° of less than 3, less than 2.9, less than 2.8, less than 2.7, less than 2.6, or less than 2.5 down to about 1.5, about 1.3, or about 1. The percent gloss at 60° of the blended composition, the thermoplastic copolymer, and other compositions discussed and described herein can be measured according to ASTM D523-14.

The blended composition can have a density from a low of about 0.89 g/cm$^3$, about 0.90 g/cm$^3$, or about 0.91 g/cm$^3$ to a high of about 0.92 g/cm$^3$, about 0.95 g/cm$^3$, about 1 g/cm$^3$, about 1.1 g/cm$^3$, about 1.2 g/cm$^3$, about 1.3 g/cm$^3$, about 1.4 g/cm$^3$, or about 1.5 g/cm$^3$. For example, the blended composition can have a density from about 0.89 g/cm$^3$ to about 0.97 g/cm$^3$, about 0.95 g/cm$^3$ to about 1.15 g/cm$^3$, about 1 g/cm$^3$ to about 1.2 g/cm$^3$, about 1.1 g/cm$^3$ to about 1.3 g/cm$^3$, about 0.93 g/cm$^3$ to about 1.3 g/cm$^3$, or about 0.94 g/cm$^3$ to about 1.1 g/cm$^3$. In another example, the blended composition can have a density of at least 0.89 g/cm$^3$, at least 0.95 g/cm$^3$, at least 1 g/cm$^3$, or at least 1.1 g/cm$^3$ and less than 1.5 g/cm$^3$, less than 1.4 g/cm$^3$, or less than 1.3 g/cm$^3$. The density of the blended composition, the thermoplastic copolymer, and other compositions discussed and described herein can be measured according to ASTM D792-13.

The thermoplastic copolymer can be or include a blend of one or more polypropylene homopolymers and one or more copolymers of propylene and one or more comonomers or "olefinic elastomers." Suitable comonomers can include, but are not limited to, ethylene, $C_4$ to $C_{20}$ olefins, or any mixture thereof. Accordingly, the term "copolymer" includes polymers composed of two or more monomers. The comonomer can be linear or branched or can include two unsaturated carbon-carbon bonds (dienes). Examples of suitable comonomers can include, but are not limited to, ethylene, 1-butene; 3-methyl-1-butene; 3,3-dimethyl-1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; styrene; or any combination or mixture thereof. Particularly preferred comonomers include ethylene, 1-butene, 1-hexene, 1-octene, or any mixture thereof.

The copolymer of propylene and the comonomer and, if present, the organic filler and/or additional ingredient(s) can be interspersed within the polypropylene homopolymer. The thermoplastic copolymers are recognized in the art as being multiphase polymer blends where the polypropylene homopolymer forms a continuous matrix phase and the copolymer (olefinic elastomer) and, if present, the organic filler and/or other compounding ingredients or additives, is/are the dispersed component(s). The thermoplastic copolymers are generally made via a multi-stage reactor process in which the polypropylene homopolymer is produced in one or more first reactors and the copolymer is produced in one or more second reactors in the presence of the polypropylene homopolymer. Alternatively, the polypropylene homopolymer can be blended, mixed, or otherwise compounded with the copolymer via post-reactor addition.

Copolymers of propylene and the comonomer that include less than 6.1 wt % of the comonomer, e.g., from about 0.5 wt % to about 6 wt % of the comonomer, are generally referred to as random copolymers. Copolymers of propylene and the comonomer that include from about 6.1 wt % and up to about 12 wt % to about 18 wt % of the comonomer are generally referred to as impact copolymers "ICPs." Copolymers of propylene and the comonomer that include greater than about 14 wt % to 18 wt % and up to about 40 wt % of the comonomer are generally referred to as polyolefin elastomers or "TPOs." In contrast to the impact copolymer and polyolefin elastomers, the random copolymers are usually made in a single stage polymerization process such that the comonomer is incorporated into the polypropylene backbone. Illustrative systems and methods for making thermoplastic copolymers are well known and can include the systems and methods discussed and described in U.S. Pat. Nos.:3,256,367; 4,956,426; 4,521,566; 7,348,381; and 8,426,520.

If two or more comonomers are present in the copolymer of propylene and the one or more comonomers, each comonomer can be present in any desired amount with respect to one another. For example, if the copolymer of propylene and the one or more comonomers includes a first comonomer and a second comonomer, the amount of the first comonomer in the copolymer can be about 1 wt % to about 99 wt % and conversely the amount of the second comonomer in the copolymer can be about 99 wt % to about 1 wt %, based on the combined weight of the first and second comonomers. In another example, the amount of the first comonomer can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first and second comonomers. Similarly, if the copolymer of propylene and the one or more comonomers includes two or more copolymers of propylene and one or more comonomers, each copolymer can be present in any amount with respect to one another. For example, if the copolymer of propylene and the one or more copolymers includes a first copolymer and a second t copolymer, the amount of the first copolymer can be about 1 wt % to about 99 wt % and conversely the amount of the second copolymer can be about 99 wt % to about 1 wt %, based on the combined weight of the first and second copolymers.

The copolymer of propylene and the comonomer can have a comonomer concentration from a low of about 0.5 wt %, about 1 wt %, about 3 wt %, about 5 wt %, about 7 wt %, about 9 wt %, about 11 wt %, about 14 wt %, about 16 wt % or about 18 wt % to a high of about 20 wt %, about 22 wt %, about 24 wt %, about 26 wt %, about 28 wt %, about 30 wt %, about 32 wt %, about 34 wt %, about 36 wt %, about 38 wt %, or about 40 wt % of the comonomer. For example, the copolymer of propylene and the comonomer can include about 0.5 wt % to about 6 wt %, about 1 wt % to about 4 wt %, about 3 wt % to about 5.5 wt %, about 0.7 wt % to about 3 wt %, about 2.5 wt % to about 5.7 wt %, or about 4.5 wt % to about 5.9 wt % of the comonomer. In another example, the copolymer of propylene and the comonomer can include about 6.1 wt % to about 12 wt %, about 6.1 wt % to about 14 wt %, about 6.1 wt % to about 16 wt %, about 6.1 wt % to about 18 wt %, about 9 wt % to about 14 wt %, about 12 wt % to about 16 wt %, about 7 wt % to about 11 wt %, about 10 wt % to about 15 wt %, about 8 wt % to about 14 wt %, or about 9 wt % to about 17 wt % of the comonomer. In another example the copolymer of propylene and the comonomer can include about 14 wt % to about 40 wt %, about 16 wt % to about 40 wt %, about 18 wt % to about 40 wt %, about 20 wt % to about 40 wt %, about 14 wt % to about 22 wt %, about 16 wt % to about 24 wt %, about 18 wt % to about 30 wt %, about 21 wt % to about 29 wt %, about 25 wt % to about 37 wt %, about 28 wt % to about 38 wt %, or about 21 wt % to about 40 wt % of the comonomer. In another example, the copolymer of propylene and the comonomer can include at least 0.5 wt %, at least 1 wt %, at least 2 wt %, at least 4 wt %, at least 6 wt %, at least 8 wt %, at least 10 wt %, at least 12 wt %, at least 14 wt %, at least 16 wt %, at least 18 wt %, or at least 20 wt % to about 22 wt %, about 24 wt %, about 26 wt %, about 28 wt %, about 30 wt %, about 32 wt %, about 34 wt %, about 36 wt %, about 38 wt %, or about 40 wt % of the comonomer.

The copolymer of propylene and the comonomer can have a melting point from a low of about 138° C., about 140° C. about 142° C., about 144° C., about 146° C., about 148° C., about 150° C., or about 152° C. to a high of about 158° C., about 160° C., about 162° C., about 164° C., about 166° C., about 168° C., about 170° C. For example, the copolymer of propylene and the comonomer can include from about 0.5 wt % to up to about 6 wt % of the comonomer and have a melting point from a low of 140° C., about 142° C., about 144° C., or about 146° C. to a high of about 148° C., about 150° C., about 152° C., about 156° C., about 158° C., or about 160° C. In another example, the copolymer of propylene and the comonomer can include from about 0.5 wt % to up to about 6 wt % of the comonomer and have a melting point from a low of 138° C., about 140° C., about 142° C., or about 144° C. and less than 155° C., less than 150° C., less than 148° C., less than 146° C., or less than 145° C. In another example, the copolymer of propylene and the comonomer can include form about 6.1 wt % to about 40 wt % of the comonomer and have a melting point from a low of about 160° C., about 162° C., or about 164° C. to a high of about 165° C., about 166° C., about 167° C., or about 170° C. The melting point of the copolymer of propylene and the comonomer can be measured according to the method disclosed in ASTM D3418-12e1, Table 17.

The thermoplastic copolymer can have a comonomer concentration from a low of about 0.5 wt %, about 1 wt %, about 3 wt %, about 5 wt %, about 7 wt %, about 10 wt %, about 12 wt %, or about 15 wt % to a high of about 17 wt %, about 20 wt %, about 22 wt %, about 24 wt %, about 26 wt %, about 28 wt %, about 30 wt %, about 33 wt %, about 35 wt %, about 37 wt %, or about 40 wt %, based on the combined weight of the polypropylene homopolymer and the copolymer of propylene and the one or more comonomers. For example, the thermoplastic copolymer can have a comonomer concentration from a low of about 0.5 wt %, about 1 wt %, about 1.5 wt %, about 2 wt %, about 3 wt %, or about 4 wt % to a high of about 5 wt %, about 5.5 wt %, about 6 wt %, about 7 wt %, about 8 wt %, about 9 wt %, or about 9.9 wt %, based on the combined weight of the polypropylene homopolymer and the copolymer of propylene and the one or more comonomers. In another example, the thermoplastic copolymer can have a comonomer concentration from a low of about 10 wt %, about 10.5 wt %, about 11 wt %, about 12 wt %, about 13 wt %, or about 14 wt % to a high of about 15 wt %, about 16 wt %, about 17 wt %, about 18 wt %, about 19 wt %, or about 20 wt %, based on the combined weight of the polypropylene homopolymer and the copolymer of propylene and the one or more comonomers. In another example, the thermoplastic copolymer can have a comonomer concentration from a low of about 20.1 wt %, about 20.5 wt %, about 21 wt %, about 21.5 wt %, about 22 wt %, about 22.5 wt %, about 23 wt %, about 23.5 wt %, or about 24 wt % to a high of about 30 wt %, about 32 wt %, about 34 wt %, about 36 wt %, about 38 wt %, or about 40 wt %, based on the combined weight of the polypropylene homopolymer and the copolymer of propylene and the one or more comonomers.

The thermoplastic copolymer can have a Notched Izod from a low of at least 60 J/m, about 70 J/m, about 80 J/m, about 90 J/m, about 100 J/m, or about 125 J/m to a high of about 200 J/m, about 250 J/m, about 300 J/m, about 350 J/m, about 400 J/m, about 450 J/m, about 500 J/m, about 550 J/m, or about 600 J/m or more. For example, the thermoplastic copolymer can have a Notched Izod of about 65 J/m to about 575 J/m, about 85 J/m to about 140 J/m, about 95 J/m to about 180 J/m, about 75 J/m to about 125 J/m, about 100 J/m to about 225 J/m, about 160 J/m to about 280 J/m, or about 140 J/m to about 340 J/m. In another example, the thermoplastic copolymer can have a Notched Izod of at least 60 J/m, at least 65 J/m, at least 75 J/m, at least 85 J/m, at least 95 J/m, at least 105 J/m, at least 120 J/m, at least 130 J/m, at least 150 J/m, at least 160 J/m, at least 175 J/m, or at least 200 J/m and up to about 450 J/m, about 500 J/m, about 550 J/m, or about 600 J/m or more. The Notched Izod of the thermoplastic copolymer can be measured according to ASTM D256-10 at 23° C.

The thermoplastic copolymer can have a melt index ($I_2$) from a low of at least 5 g/10 min, about 7 g/10 min, about 10 g/10 min, about 15 g/10 min, about 20 g/10 min, about 25 g/10 min, or about 30 g/10 min to a high of about 40 g/10 min, about 50 g/10 in, about 60 g/10 min, about 70 g/10 min, about 80 g/10 min, about 90 g/10 min, or about 100 g/10 min. For example, the thermoplastic copolymer can have a melt index ($I_2$) of about 5 g/10 to about 100 g/10 min, about 6 g/10 min to about 60 g/10 min, about 7 g/10 min to about 55 g/10 min, about 8 g/10 min to about 50 g/10 min, about 9 g/10 min to about 45 g/10 min, about 10 g/10 min to about 40 g/10 min, about 12 g/10 min to about 42 g/10 min, about 10 g/10 min to about 20 g/10 min, about 20 g/10 min to about 30 g/10 min, or about 30 g/10 min to about 40 g/10 min. In another example, the thermoplastic copolymer can have a melt index ($I_2$) of at least 5 g/10 min, at least 7 g/10 min, at least 10 g/10 min, at least 12 g/10 min, at least 14 g/10 min, at least 16 g/10 min at least 18 g/10 min, at least 20 g/10 min, at least 22 g/10 min, at least 24 g/10 min, at least 26 g/10 min, at least 28 g/10 min, or at least 30 g/10 min and up to about 40 g/10 min, about 55 g/10 min, about 60 g/10 min, about 65 g/10 min, about 70 g/10 min, about 75 g/10 min, about 80 g/10 min, about 85 g/10 min, about 90 g/10 min, about 95 g/10 min, or about 100 g/10 min. The melt index ($I_2$) of the thermoplastic copolymer can be measured according to ASTM D1238-13, procedure B (at 230° C. and 2.16 kg weight).

The thermoplastic copolymer can have a tensile strength at yield in the machine direction from a low of about 10 MPa, about 12 MPa, about 13 MPa, about 15 MPa, or about 17 MPa to a high of about 22 MPa, about 27 MPa, about 30 MPa, about 33 MPa, or about 35 MPa. For example, the thermoplastic copolymer can have a tensile strength at yield in the machine direction of about 10 MPa to about 35 MPa, about 12 MPa to about 32 MPa, about 15 MPa to about 20 MPa, about 18 MPa to about 28 MPa, or about 13 MPa to about 23 MPa. In another example, the thermoplastic copolymer can have a tensile strength at yield in the machine direction of at least 10 MPa, at least 12 MPa, at least 15 MPa, or at least 17 MPa and up to about 25 MPa, about 30 MPa, or about 35 MPa. The tensile strength at yield in the machine direction of the thermoplastic copolymer can be measured according to ASTM D638-10.

The thermoplastic copolymer can have an elongation at yield in the machine direction from a low of about 4.5%, about 5%, about 5.5%, about 6%, or about 7%, to a high of about 8%, about 8.5%, about 9%, or about 10%. For example, the thermoplastic copolymer can have an elongation at yield in the machine direction of about 4.5% to about 10%, about 5% to about 7%, about 4.7% to about 6.5%, about 4.9% to about 8%, or about 5.3% to about 9%. In another example, the thermoplastic copolymer can have an elongation at yield in the machine direction of at least 4.5%, at least 5%, at least 5.5%, or at least 6% and up to about 8%, about 9%, or about 10%. The elongation at yield in the machine direction of the thermoplastic copolymer can be measured according to ASTM D638-10.

The thermoplastic copolymer can have a flexural modulus (tangent) from a low of about 350 MPa, about 400 MPa, about 500 MPa, about 550 MPa, about 600 MPa, about 650 MPa or about 700 MPa to a high of about 1,000 MPa, about 1,200 MPa, about 1,400 MPa, about 1,600 MPa, about 1,800 MPa, or about 2,000 MPa. For example, the thermoplastic copolymer can have a flexural modulus (tangent) of about 350 MPa to about 2,000 MPa, about 400 MPa to about 1,400 MPa, about 500 MPa to about 1,100 MPa, about 600 MPa to about 1,400 MPa, about 600 MPa to about 1,600 MPa, about 650 MPa to about 1,250 MPa, about 700 MPa to about 1,150 MPa, about 700 MPa to about 1,500 MPa, or about 600 MPa to about 1,050 MPa. In another example, the thermoplastic copolymer can have a flexural modulus (tangent) of at least 500 MPa, at least 550 MPa, at least 600 MPa, or at least 650 MPa and up to about 1,000 MPa, about 1,200 MPa, or 1,400 MPa. The flexural modulus (tangent) of the thermoplastic copolymer can be measured according to ASTM D790-10, procedure A.

The thermoplastic copolymer can have a 1% Secant Modulus in the machine direction from a low of about 300 MPa, about 350 MPa, about 400 MPa, about 500 MPa, about 550 MPa, about 600 MPa, about 650 MPa or about 700 MPa to a high of about 1,000 MPa, about 1,200 MPa, about 1,400 MPa, about 1,600 MPa, about 1,800 MPa, or about 2,000 MPa. For example, the polyolefin elastomer can have a 1% Secant Modulus in the machine direction of about 300 MPa to about 2,000 MPa, about 400 MPa to about 1,400 MPa, about 500 MPa to about 1,100 MPa, about 600 MPa to about 1,400 MPa, about 600 MPa to about 1,600 MPa, about 650 MPa to about 1,250 MPa, about 700 MPa to about 1,150 MPa, about 700 MPa to about 1,500 MPa, or about 600 MPa to about 1,050 MPa. In another example, the thermoplastic copolymer can have a 1% Secant Modulus in the machine direction of at least 500 MPa, at least 550 MPa, at least 600 MPa, or at least 650 MPa and up to about 1,000 MPa, about 1,200 MPa, or 1,400 MPa. The 1% Secant Modulus of the thermoplastic copolymer can be measured according to ASTM D790-10, procedure A.

The thermoplastic copolymer can have a density from a low of about 0.85 g/cm$^3$, about 0.87 g/cm$^3$, or about 0.89 g/cm$^3$ to a high of about 0.91 g/cm$^3$, about 0.93 g/cm$^3$, or about 0.95 g/cm$^3$. For example, the thermoplastic copolymer can have a density from about 0.89 g/cm$^3$ to about 0.95 g/cm$^3$, about 0.88 g/cm$^3$ to about 0.94 g/cm$^3$, about 0.86 g/cm$^3$ to about 0.91 g/cm$^3$, about 0.90 g/cm$^3$ to about 0.94 g/cm$^3$, or about 0.89 g/cm$^3$ to about 0.92 g/cm$^3$. In another example, the thermoplastic copolymer can have a density of at least 0.86 g/cm$^3$, at least 0.87 g/cm$^3$, at least 0.88 g/cm$^3$, or at least 0.89 g/cm³ and less than 0.95 g/cm³, less than 0.94 g/cm³, or less than 0.93 g/cm³. The density of the thermoplastic copolymer can be measured according to ASTM D792-13.

The organic filler can be or include, but is not limited to, the shells, hulls, husks, or other covering of grains, flowers, fruits, nuts, beans, wood, or any mixture thereof. Illustrative grain husks, can include, but are not limited to, those of rice, maize (e.g., corn cobs or corn kernels), wheat, sorghum, or any mixture thereof. Illustrative husks of flowers can include, but are not limited to, sunflower, or any mixture thereof. Illustrative fruit husks can include, but are not limited to, those of plum, peach, cherry, apricot, olive, mango, jackfruit, guava, custard apples, pomegranates, watermelon, or any mixture thereof. Illustrative nut husks or shells can include, but are not limited to, walnut shells, pecan shells, almond shells, ivory nut shells, brazil nut shells, pine nut shells, cashew nut shells, Filbert nut (hazel nut) shells, macadamia nut shells, soy nut shells, pistachio nut shells, pumpkin seed shells, coconut, or any mixture thereof. Illustrative husks of beans can include, but are not limited to, those of peanut, soybean, chickpea, or any mixture thereof. Illustrative woods can include hardwoods, softwoods, or a mixture thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow. In at least one specific example, the organic filler can be or include one or more nut shells such as pecan shells, walnut shells, almond shells, and mixtures thereof. In another specific example, the organic filler can be or include rice husk; wheat husk; corn husk; pecan flour, or any mixture thereof. Illustrative pecan flour can include, but is not limited to, pecan shell flour, pecan wood flour, or a mixture thereof. In at least one specific example, the organic filler can be or include rice husks or rice hulls.

The organic filler can be ground, crushed, pulverized, or other otherwise reduced into particulate or particle form. For example, the shells/hulls/husks can be ground or powdered into particle form. In one example, suitable flours or powders derived from seed or nut shells can include, but are not limited to, rice husk powder, walnut shell flour, pecan shell flour, almond shell flour, peanut shell flour, wood flour, or any mixture thereof. As used herein, the terms "flour" and "powder" are used interchangeably and refer to a material in particulate or particle form. The organic filler in particulate or particle form can have a particle size from about 0.1 μm to about 1,000 μm. For example, the particle size of the organic filler can be from a low of about 1 μm, about 10, about 30 μm, about 50 μm, or about 100 μm to a high of about 200 μm, about 400 μm, about 500 μm, about 600 μm, about 700 μm, about 800 μm, about 900 μm, or about 1,000 μm. In another example, the particle size of the organic filler can be from about 25 μm to about 300 μm, about 50 to about 250, about 10 μm to about 150 μm, about 30 μm to about 275 μm, about 5 μm to about 200 μm, about 20 to about 150, or about 10 μm to about 125 μm. In another example, the particle size of the organic filler can be less than 1,000 μm, less than 900 μm, less than 800 μm, less than 700 μm, less than 600 μm, less than 500 μm, less than 400 μm, less than 300 μm, less than 250 μm, less than 200 μm, less than 150 μm, less than 100μ, less than 95 μm, less than 90 μm, less than 85 μm, less than 80 μm, less than 75 μm, less than 70 μm, less than 65 μm, less than 60 μm, or less than 55 μm. In one example, the particle size and/or particle size distribution of the organic filler can mean that all the particles having a given particle size pass through a sieve having openings of the given size. For example, the particles of an organic filler having a particle size of about 100 μm can pass through a 100 μm sieve. In another example, the particle size, average particle size, and mean particle diameter, and/or particle size distribution of the organic filler can be measured according to ASTM D1921-06.

The organic filler in particulate or particle form can have an average particle size from about 0.1 μm to about 1,000 μm. For example, the organic filler can have an average particle size from a low of about 1 μm, about 10, about 30 μm, about 50 μm, or about 100 μm to a high of about 200 μm, about 400 μm, about 500 μm, about 600 μm, about 700 μm, about 800 μm, about 900 μm, or about 1,000 μm. In another example, the organic filler can have an average particle size of from about 25 μm to about 300 μm, about 50 to about 250, about 10 μm to about 150 μm, about 30 μm to about 275 μm, about 5 μm to about 200 μm, about 20 to about 150, or about 10 μm to about 125 μm. In another example, the organic filler can have an average particle size of less than 1,000 μm, less than 900 μm, less than 800 μm, less than 700 μm, less than 600 μm, less than 500 μm, less than 400 μm, less than 300 μm, less than 250 μm, less than 200 μm, less than 150 μm, less than 100μ, less than 95 μm, less than 90 μm, less than 85 μm, less than 80 μm, less than 75 μm, less than 70 μm, less than 65 μm, less than 60 μm, or less than 55 μm.

The organic filler can have a particle size distribution in which about 1 wt %, about 5 wt %, about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 99 wt % of the organic filler can have a particle size of less than 200 μm and 1 wt % to about 99 wt % of the organic filler can have a particle size of about 200 μm to about 1,000 μm. For example, about 50 wt %, about 60 wt %, about 70 wt % or about 80 wt % of the organic filler can have a particle size of less than 200 μm, less than 150 μm, or less than 100 μm and about 20 wt %, about 30 wt %, about 40 wt %, or about 50 wt % of the organic filler can have a particle size of about 200 μm to about 600 μm, about 700 μm, about 800 μm, about 900 μm, or about 1,000 μm. In another example, the organic filler can have a particle size of less than 1,000 μm and at least 60 wt %, at least 70 wt %, at least 80 wt %, at least 90 wt %, or at least 95 wt % of the organic filler can have a particle size of less than 200 μm. In another example, about 50 wt % to about 90 wt %, about 60 wt % to about 80 wt %, or about 60 wt % to about 90 wt % of the organic filler can have a particle size of less than 100 μm and about 10 wt % to about 50 wt %, about 20 wt % to about 40 wt %, or about 10 wt % to about 40 wt % of the organic filler can have a particle size of about 100 μm to about 1,000 μm.

In one example, the blended composition can include about 5 wt % to about 30 wt % of the organic filler based on the combined weight of the thermoplastic copolymer and the organic filler and about 2% to about 50% of the organic filler in the blended composition can have a particle size from a low of about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 525 μm, about 550 μm, about 575 μm to about 600 μm to a high of about 700 μm, about 750 μm, about 800 μm, about 850 μm, about 900 μm, about 950 μm, or about 1,000 μm and about 50% to about 98% of the organic filler in the blended composition can have a particle size less than 200 μm. In another example, the blended composition can include about 5 wt % to about 30 wt % organic filler based on the combined weight of the thermoplastic copolymer and the organic filler and about 5% to about 40% of the organic filler in the blended composition can have a particle size of from a low of about 200 μm, about 225 μm, about 250 μm, about 275 μm, about 300 μm, about 325 μm, about 350 μm, about 375 μm, about 400 μm, about 425 μm, about 450 μm, about 475 μm, about 500 μm, about 525 μm, about 550 μm, about 575 μm to about 600 μm to a high of about 700 μm, about 750 μm, about 800 μm, about 850 µm, about 900 µm, about 950 µm, or about 1,000 µm and about 60% to about 95% of the organic filler in the blended composition can have a particle size of less than 200 µm, less than 175 µm, less than 150 µm, less than 125 µm, or less than 100 µm. In another example, the blended composition can include about 5 wt % to about 30 wt % organic filler and about 2% to about 50% of the organic filler in the blended composition can have a particle size of about 200 µm to about 1,000 µm, about 400 µm to about 1,000 µm, about 400 µm to about 800 µm, about 400 µm to about 650 µm, about 450 µm to about 925 µm, about 500 µm to about 775 µm, or about 550 µm to about 975 µm and about 50% to about 98% of the organic filler can have a particle size less than 200 µm. In another example, the blended composition can include about 5 wt % to about 15 wt % organic filler based on the combined weight of the thermoplastic copolymer and the organic filler, about 10% to about 30% of the organic filler can have a particle size of about 200 µm to about 1,000 µm, and about 70% to about 90% of the organic filler can have a particle size less than 200 µm. In another example, the blended composition can include about 5 wt % to about 15 wt % organic filler based on the combined weight of the thermoplastic copolymer and the organic filler, about 10% to about 30% of the organic filer can have a particle size of about 400 µm to about 1,000 µm, and about 70% to about 90% of the organic filler can have a particle size less than 200 µm.

If the organic filler includes two or more different organic fillers, the amount of each organic filler can widely vary. For example, if the organic filler includes a first filler and a second filler, the amount of the first filler in the binder composition can range from about 0.1 wt % to about 99.9 wt %, based on the combined weight of the first and second fillers. In another example, if the organic filer includes the first and second filler, the organic filler can include the first filler in an amount from a low of about 0.5 wt %, about 1 wt %, about 5 wt %, about 10 wt %, or about 20 wt % to a high of about 30 wt %, about 40 wt %, about 50 wt %, about 60 wt %, about 70 wt %, about 80 wt %, about 90 wt %, or about 95 wt %, based on the combined weight of the first and second filler.

The organic filler can be chemically unmodified from its natural state. For example, the organic filler can be free from intentional chemical reaction with any compound. The organic filler, in its natural state, can be ground or otherwise reduced in size if needed and/or dried without to provide the organic filler. Drying the organic filler can include heating the organic filler to a temperature sufficient to drive off or otherwise remove at last a portion of any water or moisture present in the organic filler. For example, rice husks or other organic filler can be heated to a temperature from a low of about 80° C., about 90° C., or about 100° C. to a high of about 110° C., about 125° C., or about 150° C. to drive off at least a portion of any water in the organic filler. In another example, rice husks or other organic filler can subjected to a freeze drying process to remove at least a portion of any water in the organic filler. The organic filler can have a water content of less than 5 wt %, less than 4 wt %, less than 3 wt %, less than 2.5 wt %, less than 2 wt %, less than 1.5 wt %, less than 1 wt %, less than 0.5 wt %, less than 0.4 wt %, less than 0.3 wt %, less than 0.2 wt %, less than 0.15 wt %, less than 0.1 wt %, less than 0.07 wt %, or less than 0.05 wt %.

The blended composition can optionally include one or more inorganic fillers. Suitable inorganic fillers can include, but are not limited to, inorganic oxides, carbon, inorganic carbonates, silicates, or any mixture thereof. Illustrative inorganic oxides can include, but are not limited to, silica, alumina, or any mixture thereof. Illustrative inorganic carbonates can include, but are not limited to, calcium carbonate, or any mixture thereof. Illustrative silicates can include, but are not limited to, mica, talc, kaolin, or any mixture thereof. Inorganic minerals such as wollastonite ($CaSiO_3$) can also be used. The inorganic filler can include calcium carbonate, talc, kaolin, mica, magnesium, calcium sulfate, or any mixture thereof. The inorganic filer can be in the form of fibers or whiskers.

If one or more inorganic fillers are present, the combined amount of the organic filler and the inorganic filler can be from about 5 wt % to about 30 wt % based on the combined weight of the thermoplastic copolymer, the organic filler, and the inorganic filler. If one or more inorganic fillers are present, the amount of the organic filler in the blended composition can be at least 1 wt %, at least 3 wt %, at least 5 wt %, at least 7 wt %, or at least 10 wt % and up to about 25 wt %, about 27 wt %, or about 29 wt % based on the combined weight of the thermoplastic copolymer, the organic filler, and the inorganic filler. As such, if the blended composition includes the inorganic filler, the blended composition can include about 1 wt %, about 3 wt %, or about 5 wt % to about 20 wt %, about 23 wt %, about 25 wt %, about 27 wt %, or 29 wt % of the inorganic filler, based on the combined weight of the thermoplastic copolymer, the organic filler, and the inorganic filler.

The blended composition can also include one or more additives. The additive can be added to the thermoplastic copolymer, the organic filler, and/or as a separate ingredient added when the thermoplastic copolymer and the organic filler are combined with one another to produce the blended composition. Illustrative additives can include, but are not limited to, one or more fragrances, one or more tackifiers, one or more waxes, one or more functionalized polymers such as acid modified polyolefins and/or anhydride modified polyolefins, one or more antioxidants (e.g., hindered phenolics such as IRGANOX® 1010 or IRGANOX® 1076 available from Ciba-Geigy), (e.g., IRGAFOS® 168 available from Ciba-Geigy), one or more oils, one or more compatabilizers, one or more adjuvants, one or more adhesion promoters, one or more plasticizers, one or more low molecular weight polymers, one or more blocking agents, one or more antiblocking agents, one or more anti-static agents, one or more release agents, one or more anti-cling additives, one or more colorants, one or more processing aids, one or more UV stabilizers, one or more heat stabilizers, one or more neutralizers, one or more lubricants, one or more surfactants, one or more nucleating agents, one or more flexibilizers, one or more rubbers, one or more optical brighteners, one or more diluents, one or more viscosity modifiers, one or more oxidized polyolefins, or any combination or mixture thereof. Illustrative fragrances can include, but are not limited to, mint extract, lemon extract, vanilla extract, coffee, or any mixture thereof. Illustrative colorants or pigments can include, but are not limited to, titanium dioxide, calcium carbonate, zinc oxide, talc, kaolin, wollastonite, or any mixture thereof. It should be noted that one or more additives can serve one purpose or more than one purpose. For example, if the blended composition includes titanium dioxide, calcium carbonate, or other colorant that colorant can also serve as an inorganic filler component in the blended composition. The use of these additives and others are well known in the art.

The blended composition can include from about 0.01 wt % to about 40 wt % additives, based on the total weight of the blended composition. As such, the amount of any one additive, if present, can be from a low of about 0.0001 wt %, about 0.001 wt %, about 0.01 wt %, about 0.1 wt %, about 0.3 wt %, about 0.5 wt %, about 0.7 wt %, about 1 wt %, about 3 wt %, or about 5 wt % to a high of about 10 wt %, about 15 wt %, about 20 wt %, about 30 wt %, or about 40 wt %, based on the total weight of the blended composition. In another example, in a blended composition that includes an additive, the blended composition can include from a low of about 0.001 wt %, about 0.01 wt %, about 0.05 wt %, about 0.1 wt %, about 0.2 wt %, about 0.3 wt %, or about 0.5 wt % to a high of about 1 wt %, about 2 wt %, about 4 w %, about 6 wt %, about 8 wt %, about 10 wt %, about 12 wt %, about 15 wt %, about 17 wt %, about 20 wt %, about 23 wt %, or about 25 wt % of the additive, based on the combined weight of the thermoplastic copolymer, the organic filler, and the additive. In another example, in a blended composition that includes an additive, e.g., a fragrance, the blended composition can include from a low of about 0.001 wt %, about 0.01 wt %, about 0.05 wt %, about 0.1 wt %, about 0.2 wt %, about 0.3 wt %, or about 0.5 wt % to a high of about 0.6 wt %, about 0.8 wt %, about 1 w %, about 2 wt %, about 3 wt %, or about 5 wt % of the additive, based on the combined weight of the thermoplastic copolymer, the organic filler, and the additive, e.g., the fragrance. In another example, in a blended composition that includes an additive, e.g., a pigment, the blended composition can include from a low of about 0.001 wt %, about 0.01 wt %, about 0.05 wt %, about 0.1 wt %, about 0.2 wt %, about 0.3 wt %, or about 0.5 wt % to a high of about 1 wt %, about 2 wt %, about 4 w %, about 6 wt %, about 8 wt %, about 10 wt %, about 12 wt %, about 15 wt %, about 17 wt %, about 20 wt %, about 23 wt %, or about 25 wt % of the additive, based on the combined weight of the thermoplastic copolymer, the organic filler, and the additive, e.g., the pigment.

If the blended composition includes a component made up of two or more different compounds, e.g., the blended composition includes two different organic fillers such as rice husks and pecan shells, the amount each component can be present in the blended composition can vary widely. For example, if the blended composition includes a first thermoplastic copolymer and a second thermoplastic copolymer, the amount of the first thermoplastic copolymer in the blended composition can be about 1 wt % to about 99 wt % and conversely the amount of the second thermoplastic copolymer in the blended composition can be about 99 wt % to about 1 wt %, based on the combined weight of the first copolymer and the second copolymer. In another example, the amount of the first thermoplastic copolymer can be from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first copolymer and the second copolymer.

In one example, the blended composition can be made by blending a first thermoplastic copolymer with a concentrated blend. The first thermoplastic copolymer can include a blend of a first polypropylene homopolymer and a first copolymer of propylene and a first comonomer. The first comonomer can be or include ethylene, a $C_4$ to $C_{20}$ olefin, or any mixture thereof. The first copolymer of propylene and the first comonomer can include about 0.5 wt % to about 40 wt % of the first comonomer. The concentrated blend can include the organic filler and one or more second thermoplastic copolymers, one or more second polypropylene homopolymers, or any mixture thereof, where the organic filler is present in an amount greater than 30 wt % to about 55 wt %, based on the combined weight of the organic filler and the second thermoplastic copolymer and/or the second polypropylene homopolymer. For example, the concentrated blend can include greater than 30 wt % to about 55 wt % of the organic filler and (1) the second thermoplastic copolymer, (2) the second polypropylene homopolymer, or (3) the second thermoplastic copolymer and the second polypropylene homopolymer. The first thermoplastic copolymer, the second thermoplastic copolymer, the first polypropylene homopolymer, and the second polypropylene copolymer can include the thermoplastic copolymer and the polypropylene homopolymer discussed and described above. The first and second thermoplastic copolymers can be the same or different with respect to one another. The first and second polypropylene homopolymers can be the same or different with respect to one another.

The concentrated blend of the organic filler can include from a low of greater than 30 wt %, about 31 wt %, about 33 wt %, about 35 wt %, about 37 wt %, or about 40 wt % to a high of about 45 wt %, about 47 wt %, about 50 wt %, about 53 wt %, or about 55 wt % of the organic filler based on the combined weight of the organic filler, any polypropylene homopolymer, and any thermoplastic copolymer. The concentrated blend of the organic filler can be blended with the thermoplastic copolymer (first thermoplastic copolymer) discussed and described above to produce the blended composition containing about 5 wt % to about 30 wt % organic filler. If a concentrated blend of the organic filler is used to make the blended composition and the concentrated blend contains a thermoplastic copolymer (second thermoplastic copolymer), the thermoplastic copolymer in the concentrated blend can be the same or different from the thermoplastic copolymer (first thermoplastic copolymer) used to make the blended composition that includes about 5 wt % to about 30 wt % of the organic filler. As such, in at least one specific embodiment a concentrated blend containing a second thermoplastic copolymer and greater than 30 wt % organic filler can be blended with a first thermoplastic copolymer to produce the blended composition that includes about 5 wt % to about 30 wt % of the organic filler, where the first and second thermoplastic copolymers are the same or different with respect to one another.

The concentrated blend containing greater than 30 wt % to about 55 wt % of the organic filler can have a Notched Izod from a low of about 10 J/m, about 12 J/m, about 15 J/m, about 17 J/m, about 20 J/m, about 23 J/m, about 30 J/m, or about 35 J/m to a high of about 50 J/m, about 75 J/m, about 100 J/m, about 150 J/m, about 200 J/m, about 250 J/m, or about 300 J/m. For example, the concentrated blend can have a Notched Izod of about 10 J/m to about 50 J/m, about 10 J/m to about 40 J/m, about 30 J/m to about 100 J/m, about 65 J/m to about 125 J/m, about 80 J/m to about 190 J/m, about 110 J/m to about 230 J/m, or about 130 J/m to about 280 J/m. In another example, the concentrated blend can have a Notched Izod greater than 10 J/m, greater than 12 J/m, greater than 15 J/m, or greater than 17 J/m and less than 26 J/m, less than 24 J/m, less than 22 J/m, less than 20 J/m, or less than 18 J/m. In another example, the concentrated blend containing greater than 30 wt % to about 55 wt % of the organic filler can have a Notched Izod from a low of about 8 J/m, about 10 J/m, about 12 J/m, about 14 J/m, about 16 J/m, about 18 J/m, about 20 J/m or about 22 J/m to a high of about 28 J/m, about 32 J/m, about 36 J/m, about 40 J/m, about 44 J/m, about 48 J/m, or about 55 J/m. The Notched Izod of the concentrated blend containing the organic filler can be measured according to ASTM D256-10 at 23° C.

The concentrated blend containing greater than 30 wt % to about 55 wt % of the organic filler can have a melt index ($I_2$) from a low of about 5 g/10 min, about 10 g/10 min, about 20 g/10 min, or about 30 g/10 min to a high of about 50 g/10 min, about 60 g/10 in, about 75 g/10 min, about 85 g/10 min, or about 100 g/10 min. For example, the concentrated blend can have a melt index ($I_2$) of about 10 g/10 to about 50 g/10 min, about 17 g/10 min to about 35 g/10 min, about 23 g/10 min to about 45 g/10 min, about 27 g/10 min to about 53 g/10 min, about 35 g/10 min to about 70 g/10 min, about 40 g/10 min to about 80 g/10 in, or about 15 g/10 min to about 45 g/10 min. In another example, the concentrated blend can have a melt index ($I_2$) of at least 5 g/10 min, at least 10 g/10 min, at least 15 g/10 min, or at least 20 g/10 min and less than 100 g/10 min, less than 80 g/10 min, less than 60 g/10 min, or less than 50 g/10 min. The melt index ($I_2$) of the concentrated blend containing the organic filler can be measured according to ASTM D1238-13, procedure B (at 230° C. and 2.16 kg weight).

The concentrated blend containing greater than 30 wt % to about 55 wt % of the organic filler can have a tensile strength at yield in the machine direction from a low of about 10 MPa, about 15 MPa, about 20 MPa, or about 25 MPa to a high of about 30 MPa, about 35 MPa, about 40 MPa, about 45 MPa, or about 50 MPa. For example, the concentrated blend can have a tensile strength at yield in the machine direction of about 12 MPa to about 33 MPa, about 17 MPa to about 42 MPa, about 10 MPa to about 50 MPa, about 15 MPa to about 30 MPa, about 23 MPa to about 47 MPa, or about 13 MPa to about 27 MPa. In another example, the concentrated blend can have a tensile strength at yield in the machine direction of less than 50 MPa, less than 45 MPa, less than 40 MPa, or less than 35 MPa and greater than 10 MPa, greater than 15 MPa, or greater than 20 MPa. The tensile strength at yield in the machine direction of the concentrated blend containing the organic filler can be measured according to ASTM D638-10.

The concentrated blend containing greater than 30 wt % to about 55 wt % of the organic filler can have an elongation at yield in the machine direction from a low of about 0.5%, about 1%, about 3%, about 5%, or about 7% to a high of about 10%, about 12%, or about 15%. For example, the concentrated blend can have an elongation at yield in the machine direction of about 1% to about 8%, about 2% to about 10%, about 2% to about 6%, about 1% to about 5%, about 3% to about 12%, or about 0.7% to about 8.5%. In another example, the concentrated blend can have an elongation at yield in the machine direction of less than 15%, less than 12%, less than 10%, or less than 8% and greater than 0.5%, greater than 1%, or greater than 2%. The elongation at yield in the machine direction of the concentrated blend containing the organic filler can be measured according to ASTM D638-10.

The concentrated blend containing greater than 30 wt % to about 55 wt % of the organic filler can have a flexural modulus (tangent) from a low of about 900 MPa, about 1,000 MPa, about 1,100 MPa, about 1,200 MPa, about 1,300 MPa, or about 1,500, MPa to a high of about 2,000 MPa, about 2,500 MPa, about 3,000 MPa, about 3,500 MPa, or about 4,000 MPa. For example, the concentrated blend can have a flexural modulus (tangent) of about 900 MPa to about 4,000 MPa, about 1,050 MPa to about 3,600 MPa, about 1,100 MPa to about 3,200 MPa, about 1,150 MPa to about 2,700 MPa, or about 1,200 MPa to about 2,500 MPa. In another example the concentrated blend can have a flexural modulus (tangent) of at least 900 MPa, at least 1,000 MPa, at least 1,200 MPa, at least 1,400 MPa, at least 1,550 MPa, at least 1,650 MPa, at least 1,800 MPa, at least 2,050 MPa, or at least 2,200 MPa and up to about 2,500 MPa, about 3,000 MPa, about 3,500 MPa, or about 4,000 MPa. The flexural modulus (tangent) of the concentrated blend containing the organic filler can be measured according to ASTM D790-10, procedure A.

The concentrated blend containing greater than 30 wt % to about 55 wt % of the organic filler can have a 1% Secant Modulus in the machine direction from a low of about 800 MPa, about 1,000 MPa, or about 1,200 MPa to a high of about 2,500 MPa, about 3,000 MPa, about 3,500 MPa, or about 4,000 MPa. For example, the concentrated blend can have a 1% Secant Modulus in the machine direction of about 800 MPa to about 4,000 MPa, about 900 MPa to about 3,300 MPa, about 1,100 MPa to about 2,900 MPa, about 950 MPa to about 1,700 MPa, about 1,300 MPa to about 2,400 MPa, about 1,800 MPa to about 2,800 MPa, about 2,000 MPa to about 3,400 MPa, or about 1,200 MPa to about 2,500 MPa. In another example, the concentrated blend can have a 1% Secant Modulus in the machine direction of at least 900 MPa, at least 1,000 MPa, at least 1,100 MPa, at least 1,200 MPa, at least 1,300 MPa, at least 1,400 MPa, at least 1,500 MPa, at least 1,550 MPa, at least 1,720 MPa, at least 1,970 MPa, or at least 2,120 MPa and up to about 2,500 MPa, about 3,000 MPa, about 3,500 MPa, or about 4,000 MPa. The 1% Secant Modulus in the machine direction of the concentrated blend containing the organic filler can be measured according to ASTM D790-10, procedure A.

The concentrated blend containing greater than 30 wt % to about 55 wt % of the organic filler can have a yellowness index (plaques) from a low of about 70, about 75, about 77, or about 80 to a high of about 85, about 90, about 95, or about 98. For example, the concentrated blend can have a yellowness index (plaques) of about 73 to about 97, about 80 to about 95, about 80 to about 88, about 87 to about 97, or about 83 to about 95. The yellowness index of the concentrated blend, when formed into pellets, can be measured according to ASTM D6290-13. The yellowness index of the concentrated blend, when formed into plaques, can be measured according to ASTM D1925-94(1988) (withdrawn in 1995).

The concentrated blend containing greater than 30 wt % to about 55 wt % of the organic filler can have a percent gloss at 60° from a low of about 10, about 15, about 20, about 25, about 30, or about 35 to a high of about 60, about 65, about 70, about 75, or about 80. For example, concentrated blend can have a percent gloss at 60° from about 15 to about 75, about 20 to about 70, about 20 to about 40, about 25 to about 45, about 35 to about 65, or about 30 to about 60. In another example, the concentrated blend can have a percent gloss at 60° of at least 10, at least 15, at least 20, or at least 25 and up to about 70, about 75, or about 80. The percent gloss at 60° of the concentrated blend containing the organic filler can be measured according to ASTM D523-14.

The concentrated blend containing greater than 30 wt % to about 55 wt % of the organic filler can have a density from a low of about 0.89 g/cm$^3$, about 0.93 g/cm$^3$, about 0.95 g/cm$^3$, about 1 g/cm$^3$, about 1.1 g/cm$^3$, or about 1.2 g/cm$^3$ to a high of about 1.3 g/cm$^3$, about 1.4 g/cm$^3$, about 1.5 g/cm$^3$, about 1.6 g/cm$^3$, or about 1.7 g/cm$^3$. For example, the concentrated blend can have a density from about 0.9 g/cm$^3$ to about 1.55 g/cm$^3$, about 0.91 g/cm$^3$ to about 1.5 g/cm$^3$, or about 0.95 g/cm$^3$ to about 1.4 g/cm$^3$. In another example, the concentrated blend can have a density of at least 0.89 g/cm$^3$, at least 0.9 g/cm$^3$, at least 0.91 g/cm$^3$, at least 0.95 g/cm$^3$, or at least 1 g/cm$^3$ and less than 1.6 g/cm$^3$, less than 1.55 g/cm$^3$, or less than 1.55 g/cm$^3$. The density of the concentrated blend containing the organic filler can be measured according to ASTM D792-13.

The thermoplastic copolymer and the organic filler and/or the thermoplastic copolymer and the concentrated blend of the organic filler can be blended, mixed, or otherwise combined with one another to produce the blended composition using conventional equipment and methods. For example, the components can be dry blended and subsequently melt mixed in a mixer or by mixing the components together directly in a mixer, such as, for example, a BANBURY® mixer, a Haake mixer, a BRABENDER® internal mixer, or a single or twin-screw extruder, which can include a compounding extruder and/or a side-arm extruder. In another example, the thermoplastic copolymer and the organic filler can be processed in a mixer, such as a co-rotating or counter-rotating, intermeshing or non-intermeshing twin screw mixer or extruder. Such mixers or extruders are well known in the art and are commercially available from various sources such as COPERION®, FARREL®, and KRASS MAFFEI®.

The components of the blended composition can be introduced via a hopper to a feeding zone of the mixer and/or extruder. The temperature of the feeding zone can generally be below the melting temperature of the polymer component and can typically be between 20° C. and 100° C., which can be maintained by cooling the mixer or extruder. The thermoplastic copolymer and the organic filler can be compressed within the feeding zone and conveyed toward a melting zone. The temperature within the melting zone can be increased to a temperature sufficient to at least partially melt the thermoplastic copolymer. Preferably, the temperature within the melting zone is sufficient to substantially melt all the thermoplastic copolymer. By "substantially melt" it is intended that greater than 90 wt %, greater than 95 wt %, greater than 97 wt %, greater than 99 wt %, or 100 wt % of the thermoplastic copolymer is melted.

Although the terms "mixer" and "extruder" are often used loosely and interchangeably, one skilled in the art will appreciate that mixers, such as the commercially available Farrel mixer, operate at relatively low pressures, typically about 689 kPa (100 psi) or less, and the zones within the mixer are generally not completely filled with resin. In extruders, such as the commercially available BERSTORFF® 2E40×47D extruder from KRASS MAFFEI®, operations can be at higher pressures in at least some zones. The blended compositions discussed and described herein can be made with one or more mixers, one or more extruders, or any combination thereof.

As discussed above, it has been surprisingly and unexpectedly found that mixing or blending the thermoplastic copolymer and the organic filler and further processing of the blended composition at controlled temperatures can produce a blended composition and articles made therefrom having little to no undesirable scent or malodor "offensive odor." In producing the blended composition and making articles therefrom having little to no malodor, the temperature can be maintained at less than 205° C., less than 200° C., less than 195° C., less than 190° C., less than 189° C., less than 188° C., less than 187° C., less than 186° C., less than 185° C., less than 184° C., less than 183° C., less than 182° C., less than 181° C., less than 180° C., less than 179° C., less than 178° C., less than 177° C., less than 176° C., less than 175° C., less than 174° C., less than 173° C., less than 172° C., less than 171° C., or less than 170° C. Organic fillers can tend to degrade and produce odors that are offensive in nature. If the processing temperatures are kept sufficiently low enough to prevent this decomposition, the odor can be vastly reduced and the plastic articles can be used in more applications.

The thermoplastic copolymer and organic filler and/or the blended composition can be maintained at a temperature less than 205° C., less than 200° C., less than 195° C., less than 190° C., less than 185° C., less than 180° C., less than 177° C., less than 175° C., less than 173° C., or less than 171° C. for about 90% or more, about 91% or more, about 92% or more, about 93% or more, about 94% or more, about 95% or more, about 96% or more, about 97% or more, about 98% or more, about 99% or more, or about 100% of the time the thermoplastic copolymer and the organic filler are mixed or blended with one another to produce the blended composition. The thermoplastic copolymer and organic filler and/or the blended composition can be maintained at a temperature less than 205° C., less than 200° C., less than 195° C., less than 190° C., less than 185° C., less than 180° C., less than 177° C., less than 175° C., less than 173° C., or less than 171° C. for at least 90%, at least 91%, at least 92%, at least 93%, at least 94%, at least 95%, at least 96%, at least 97%, at least 98%, at least 99%, or 100% of the time the thermoplastic copolymer and the organic filler are mixed or blended with one another to produce the blended composition.

The blended composition can be maintained at a temperature less than 205° C., less than 200° C., less than 195° C., less than 190° C., less than 185° C., less than 180° C., less than 177° C., less than 175° C., less than 173° C., or less than 171° C. for about 90% or more, about 91% or more, about 92% or more, about 93% or more, about 94% or more, about 95% or more, about 96% or more, about 97% or more, about 98% or more, about 99% or more, or about 100% of the time the blended composition is subjected to processing into an article or final product. The blended composition can be maintained at a temperature less than 205° C., less than 200° C., less than 195° C., less than 190° C., less than 185° C., less than 180° C., less than 177° C., less than 175° C., less than 173° C., or less than 171° C. for at least 90%, at least 91%, at least 92%, at least 93%, at least 94%, at least 95%, at least 96%, at least 97%, at least 98%, at least 99%, or 100% of the time the blended composition is subjected to processing into an article or final product.

In one or more embodiments, the amount of the thermoplastic copolymer and the organic filler and/or the blended composition subjected to a temperature greater than 180° C., greater than 185° C., greater than 190° C., greater than 195° C., greater than 200° C., or greater than 205° C. can be less than 50 wt %, less than 40 wt %, less than 35 wt %, less than 30 wt %, less than 25 wt %, less than 20 wt %, less than 15 wt %, less than 10 wt %, less than 5 wt %, less than 3 wt %, less than 1 wt %, or less than 0.5 wt % of the thermoplastic copolymer and the organic filler and/or the blended composition. For example, if 100 grams of a blended composition is prepared, the amount of the blended composition heated to a temperature great than 180° C., greater than 185° C., greater than 190° C., greater than 195° C., greater than 200° C., or greater than 205° C. during mixing or blending of the thermoplastic copolymer and the organic filler can be less than 50 g, less than 40 g, less than 30 g, less than 20 g, less than 10 g, less than 5 g, less than 1 g, less than 0.5 g, or less than 0.1 g of the blended composition.

It should be noted that depending, at least in part, on the particular end use and/or other factors the thermoplastic copolymer and the organic filler can be mixed or blended at a temperature greater than 205° C. for an extended period of time. For example, the thermoplastic copolymer and the organic filler can be mixed or blended with one another at a temperature greater than 205° C., e.g., about 206° C. to about 230° C., for the entire time the components are mixed or blended with one another. It should also be noted that depending, at least in part, on the particular end use and/or other factors the blended composition can also be processed at a temperature greater than 205° C. for an extended period of time.

Normally as the filler size is decreased the Izod impact improves. It has been surprisingly and unexpectedly discovered, however, that the Izod impact is not dependent on the size of the organic filler. More particularly, it has been found that large particles provide the same or substantially the same Izod impact properties as smaller particles. It has been found that the organic filler in the blended composition tends to show ductility which maintains the Izod properties. For example, no loss in Izod impact properties was observed in going from 300 microns to 50 microns in size when the organic filler was rice husk hulls.

The gloss effects can be tailored with the particle size. Smaller organic filler particle sizes can increase the gloss, whereas larger organic filler particle sizes can lower the gloss of the finished article. It has also been found that increasing the amount (volume) of filler can reduce the gloss. This provides a manner to tailor the gloss level that is desired. Interior parts of transportation vehicles tend to need to have low gloss parts to prevent reflection from the sun whereas appliance parts and other household plastic articles tend to favor high gloss finishes. Low gloss values are generally below 50% and high gloss values are generally over 60%.

Another surprising and unexpected result found in the manufacture of articles with the blended composition was that the organic filler can also impart a granite-like surface appearance. More particularly, it was found that organic fillers having a particle size of about 200 um to about 1,000 um, when used in conjunction with an additive to impart a light color to the material, can produce a granite-like surface appearance. Calcium Stearate and/or titanium dioxide (TiO$_2$) can be used as the additive, for example, to achieve this end result. In one example, a blended composition having a granite-like appearance can include from about 5 wt % to about 15 wt % organic filler based on the combined weight of the thermoplastic copolymer and the organic filler, where about 60% to about 90% of the organic filler can have a particle size less than 100 µm and about 10% to about 40% of the organic filler can have a particle size from about 200 µm to about 1,000 µm. In another example, a blended composition having a granite-like appearance can include from about 5 wt % to about 30 wt % organic filler based on the combined weight of the thermoplastic copolymer and the organic filler, where about 2% to about 50% of the organic filler can have a particle size less from about 200 µm to about 1,000 µm or about 400 µm to about 1,000 µm.

The blended compositions discussed and described herein can be used in a wide variety of applications involving molding or extrusion, including consumer goods, industrial goods, construction materials, packaging materials, and automotive parts. The blended compositions can be used alone or in combination with one or more other polymers, blends of polymers, and the like, to produce an end use product. Articles can be made, formed, extruded, or otherwise manufactured via any useful molding or continuous extrusion process capable of forming and shaping polymers. Suitable processes for manufacturing one or more articles can include, but are not limited to, compression molding, injection molding, co-injection molding, gas-assisted injection molding, thermoforming, blow molding, multi-layer blow molding, injection blow molding, stretch blow molding, extrusion blow molding, transfer molding; cast molding, rotational molding, foam molding, slush molding, transfer molding, wet lay-up or contact molding, cast molding, cold forming matched-die molding, vacuum forming, film blowing, film or sheet casting, sheet extrusion, profile extrusion or co-extrusion, fiber spinning, fiber spunbonding, fiber melt blowing, lamination, calendering, coating, pultrusion, protrusion, draw reduction, foaming, or combinations thereof.

Illustrative articles can include, but are not limited to, tubing, pipes, packaging such as durable and disposable packaging, household items such as tumblers and plates, household appliances such as washing machines, refrigerators, blenders, air conditioners, etc., indoor and outdoor furniture such as tables, chairs, benches, shelving, etc., sporting equipment such as skis, surfboards, skateboards, skates, boots, sleds, scooters, kayaks, paddles, etc., solid wheels, stadium seating, amusement park rides, personal protective equipment such as safety helmets, shin guards, etc., cookware, utensils, trays, pallets, carts, tanks, tubs, pond liners, storage containers such as crates, pails, jars, bottles, etc., toys, child car seats and booster chairs, medical devices, sportswear, luggage, tool housings such as those for drills, saws, etc., electronics housings such as those for televisions, computers, phones, hand-held devices, media players, stereos, radios, clocks, etc., building construction materials such as flooring, siding, roofing, counter tops, electrical housings and connectors, etc., lighting, gardening equipment such as handles on shovels, wheelbarrows, etc., playground equipment, motor housings, pump housings, battery housings, instrument housings, switches, knobs, buttons, handles, pet supplies, laboratory supplies, personal hygiene devices such as razors, brushes, hairdryers, etc., cleaning supplies such as brooms, dust pans, etc., musical instrument cases, statues, trophies, artwork, costume jewelry, picture frames, eyeglass frames, plant pots, cosmetic packaging, flower pots, appliance covers, plastic trim for use in homes, decorative items, stands such as those for supporting plants, soap closures and dispensers, caps and closures, toys, crates, portable coolers or ice chests, parts meters, water dispersing tools such as sprinklers and sprayers, firearm components, and automotive components. One particularly suitable use or application for the blended composition having a granite-like appearance can be to make counter tops therewith. Illustrative counter tops can include, but are not limited to, kitchen counter tops, bathroom counter tops, food preparation tops, and the like. Other particularly suitable articles that can be made from or with the blended composition having a granite-like appearance can include cutting boards, furniture, flooring tiles, building stones, memorial stones or headstones, mailboxes, and the like.

Considering automotive components in more detail, the blended composition can be used in the manufacture of automotive components or parts that can include, but are not limited to, bumpers, exterior and/or interior body panels such as dashboards and door panels; exterior trim, including body side moldings, side cladding and molding, end caps, hoods, deck lids, mirror housings, roof racks, wheel covers, wheel liners, wheel flares, fender liners, hub caps, running boards, step pads, sill plates, air dams, splash shields, mud guards, bed liners, and rocker panels; fuel tanks; interior trim, including steering column covers, consoles, door panels, pillars, supports, knobs, buttons, handles, and safety screens; instrument panels and dash boards; knee bolsters; passenger side airbag covers; headliners; glove boxes, trays, cup holders, compartments, and lids; seat components, including backs, supports, and safety belt securing devices; under-hood applications, including battery trays and fan shrouds; electrical housings; cable bearings; and structural components, including door carriers, truck bed separators, load floors, and trunk dividers.

EXAMPLES

In order to provide a better understanding of the foregoing discussion, the following non-limiting examples are offered. Although the examples can be directed to specific embodiments, they are not to be viewed as limiting the invention in any specific respect.

A propylene homopolymer (polymer A), an impact copolymer B, and three polyolefin elastomers (polymers C-E) were used in these examples. The properties of polymers A-E are shown in Table 1 below.

TABLE 1

| | Polymer | | | | | |
|---|---|---|---|---|---|---|
| | A | B | C | D | E | F |
| Type of Polymer | Homopolymer | ICP | TPO | TPO | TPO | Random |
| EPR (wt %) | 0 | 19 | 21.5 | 26.5 | 24 | — |
| Total ethylene (wt %) | 0 | 9.2 | 9 | 15.9 | — | 3.2 |
| I$_2$ (g/10 min at 230° C., 2.16 kg) | 35 | 20 | 35 | 10 | 15 | 35 |
| Density (g/cm$^3$) | 0.9 | 0.9 | 0.9 | 0.9 | 0.9 | 0.9 |
| Tensile Strength @ yield (MPa) | 34.2 | 25 | 20 | 16.5 | 19 | 30 |
| Elongation at yield (%) | 4 | 11 | 7 | 7 | 8 | 12 |
| Flexural modulus (MPa) | 1,500 | 1,300 | 860 | 800 | 660 | 990 |

TABLE 1-continued

|  | Polymer | | | | | |
| --- | --- | --- | --- | --- | --- | --- |
|  | A | B | C | D | E | F |
| Notched Izod at 23° C. (J/m) | 22 | 120 | 530 | No break | No break | 40 |
| Yellowness Index, ASTM DD6290-13 (pellets) | — | — | −2.5 | — | — | — |
| % Gloss (60°) | — | — | 81.4 | — | — | — |

Blended compositions that contained rice husks (RH) and one or more of the polymers (A-E) were prepared by blending the components in a BERSTORFF® 2E40×47D twin screw extruder that had a screw length to diameter (L/d) equal to 44. The rice husk had a particle size below 100 μm and a moisture concentration of less than 0.2 wt %. The extruder had ten zones. The temperature profile of the extruder went from 147° C. in zone 1 to 180° C. in zone 10. Pellets of the polymer and rice husk powder were fed to the main feed zone using a two auger feeder. A GALA® under water pelletizer with a 10 die hole was used to produce pellets of the blended composition. Pellets of the blended composition and were then formed into test samples with a SUMITOMO® SE100 D injection molding machine. The testing samples were prepared according to ASTM D4101-14. The melt temperature of the blended composition during preparation of the test samples was 190° C.

Example I

The mechanical properties of two comparative examples (CEx. 1 and CEx. 2) and five inventive examples (Ex. 1-5) are shown in Table 2 below. The Polybond blended with the ICP copolymer B was POLYBOND® 3200 from Addivant USA, LCC and is a maleic anhydride grafted polypropylene having an MFR of 115 g/10 min.

TABLE 2

| Property | CEx. 1 | CEx. 2 | Ex. 1 | Ex. 2 | Ex. 3 | Ex. 4 | Ex. 5 |
| --- | --- | --- | --- | --- | --- | --- | --- |
| Composition | A + 20% RH | B + 2% Polybond | B + 5% RH | B + 10% RH | B + 20% RH | C + 10% RH | C + 20% RH |
| $I_2$ (g/10 min at 230° C., 2.16 kg) | 33.0 | 27.1 | 26.0 | — | — | 31 | 19.7 |
| Tensile Strength @ yield (MPa) | 31.0 | 26.0 | 25.0 | 24.3 | 24.3 | 16.6 | 18.5 |
| Elongation @ yield (%) | 4.0 | 6.7 | 5.7 | 4.9 | 3.4 | 5.5 | 2.4 |
| Flexural Modulus (Tangent) (MPa) | 1,800 | 1,200 | 1,290 | 1,410 | 1,590 | 940 | 1,600 |
| Notched Izod @ 23° C. (J/m) | 21.4 | 144.2 | 80.1 | 64.1 | 48.1 | 122.8 | 32.0 |
| Yellowness Index, ASTM D1925-94 (plaques) | 97.0 | −2.2 | 82.1 | 91.9 | 85.9 | 87.1 | 94.7 |
| % Gloss (60°) | 57.7 | 75.2 | 72.0 | 74.8 | 31.9 | 54.5 | 21.3 |

Surprisingly and unexpectedly the mechanical properties of Examples 1-5 showed a balance between processibility and a toughness greater than 21.5 J/m. As such, these blended compositions can be used for making articles such rigid packaging, caps and closures, and durable applications such as appliances, lawn mowers, agricultural machines, rigid luggage, conduit pipes, and automotive applications.

Example II

The mechanical properties shown in Table 3 are for six inventive examples (Ex. 6-11) that were prepared by blending thermoplastic copolymer D with thermoplastic copolymer C that contained 40 wt % rice husk powder. The final amount of rice husk in Examples 6-11 was from 5 wt % to 30 wt %.

TABLE 3

|  | Ex. 6 | Ex. 7 | Ex. 8 | Ex. 9 | Ex. 10 | Ex. 11 |
| --- | --- | --- | --- | --- | --- | --- |
| Rice Husk (wt %) | 5 | 10 | 15 | 20 | 25 | 30 |
| Estimated EPR % | 25.9 | 25.3 | 24.6 | 24 | 23.4 | 22.8 |
| $I_2$ (g/10 min at 230° C., 2.16 kg) | 12 | 13 | 13 | 19 | 21 | 25 |

TABLE 3-continued

|  | Ex. 6 | Ex. 7 | Ex. 8 | Ex. 9 | Ex. 10 | Ex. 11 |
|---|---|---|---|---|---|---|
| Tensile Strength @ yield (MPa) | 16.9 | 17 | 17.2 | 17.5 | 17.7 | 18 |
| Elongation @ yield (%) | 4.83 | 4.42 | 3.98 | 3.52 | 3.17 | 2.74 |
| Flexural Modulus (Tangent) (MPa) | 830 | 886 | 990 | 1,090 | 1,210 | 1,310 |
| Notched Izod @ 23° C. (J/m) | 352.4 | 165.5 | 96.1 | 58.7 | 42.7 | 32.0 |
| Yellowness Index, ASTM D6290-13 (pellets) | 8.5 | 14.1 | 24.5 | 37.9 | 46.3 | 39.7 |
| Yellowness Index, ASTM D1925-94 (plaques) | 79 | 90 | 94 | 93 | 90 | 89 |
| % Gloss (60°) | 29.6 | 30.6 | 34 | 33.8 | 28.9 | 26.7 |

The results shown in Table 3 indicate that blending thermoplastic copolymer D with thermoplastic copolymer C that contained 40 wt % rice husk further improved the notched Izod of the blended composition containing the rice husk. It should be noted that thermoplastic composition D had a greater rubber content and a greater molecular weight (lower $I_{21}$) than thermoplastic copolymer C. The notched Izod and flexural modulus values for Examples 6 and 7 indicate that these blended compositions can be used for automotive parts (interior and exterior) where the requirements of Izod and flexural modulus are 100 J/m and 900 MPa, respectively.

Example III

The concentrated rice husk blends that contained 40 wt % rice husks in thermoplastic copolymer C were let down during the injection molding step by blending with thermoplastic copolymer C. Table 5 shows the properties of the blended compositions of these blends (Ex. 12-16).

TABLE 4

|  | Ex. 12 | Ex. 13 | Ex. 14 | Ex. 15 | Ex. 16 |
|---|---|---|---|---|---|
| Description: | 20% RH | 20% RH | 15% RH | 10% RH | 40% RH |
| $I_2$ (g/10 min at 230° C., 2.16 kg) | 26 | 28 | 39 | 37 | 24 |
| Tensile Strength @ yield (MPa) | 18.9 | 19.3 | 19.1 | 19.1 | 18.7 |
| Tensile Strength @ yield (psi) | 2,740 | 2,800 | 2,770 | 2,770 | 2,710 |
| Elongation @ yield (%) | 2.83 | 2.65 | 3.45 | 4.65 | 2.22 |
| Flexural Modulus (Tangent) (MPa) | 1,410 | 1,510 | 1,270 | 1,080 | 1,600 |
| Flexural Modulus (Secant 1%) (MPa) | 1,340 | 1,420 | 1,200 | 1,020 | 1,530 |
| Notched Izod @ 23° C. (J/m) | 36.8 | 27.1 | 34.5 | 49.1 | 22.8 |
| Type of Break | 1P/4CB | 5CB | 4CB/1H | 5CB | 5CB |
| Yellowness Index, ASTM D6290-13 (pellets) | — | 89.7 | 49.5 | 24.5 | 73.2 |
| Yellowness Index, ASTM D1925-94 (plaques) | — | 96.6 | 95.6 | 101 | 89.3 |
| % Gloss (60°) | — | 32.9 | 33.5 | 47.3 | 25.6 |

Ex. 12 was made by direct melt blending of 20% rice husk with copolymer C. Ex. 5 and Ex. 9 shown in Tables 2 and 3, respectively, were made by direct melt blending of 20% rice husk with thermoplastic C. The properties of Ex. 12 and Ex. 13 were comparable to Ex. 5 and Ex. 9. Accordingly, the results shown in Table 4 indicate that the blended compositions that include the rice husk can be prepared by letting down concentrated rice husk blends without causing a significant change in mechanical properties.

Example IV

A disk made from a blend of thermoplastic copolymer E and rice husk powder was made that had a granite-like appearance. The radius of the disk was 2.5 inches. The disk was made with 10 wt % rice husk and 1.6 wt % titanium dioxide. The particle size distribution of the rice husk was 80% of the rice husk particle were less than 100 microns and 20% of rice husk particles were between about 200 microns and about 1,000 microns. The mechanical properties of the disk are shown in Table 5 below.

TABLE 5

|  | Ex. 17 |
|---|---|
| Description: | E + 10% RH + 1.6% TiO2 |
| Conditioning for physical tests Properties | 48 h/23/50 |
| Tensile Strength @ yield (MPa) | 19.1 |
| Elongation @ yield (%) | 6.25 |
| Flexural Modulus (Tangent) (MPa) | 947 |
| Flexural Modulus (Secant 1%) (MPa) | 907 |
| Notched Izod @ 23° C. (J/m) | 136.9 |
| Type of Break | 5PB |
| Yellowness Index, ASTM D1925-94 (plaques) | 22.1 |
| % Gloss (60°) | 56.2 |

Example V

Odor generated during processing of the blended compositions is a potential drawback for many applications such as closures and automotive applications. Accordingly, experiments were conducted to evaluate the odor generated during processing the blended compositions. The blended composition was a blend of copolymer C with about 10 wt % rice husk.

TABLE 6

|  | Extrusion Temperature (° C.) | Darkness (L) | Odor description |
|---|---|---|---|
| CEx. 3 | 200 | 33 | Burned popcorn odor |
| Ex. 18 | 195 | 34 | Less odor |
| Ex. 19 | 190 | 37 | Slight odor |
| Ex. 20 | 180 | 39 | No noticeable odor |

It was found that the processing temperature was the main contributor to the odor generated during processing of the blended compositions. Surprisingly and unexpectedly it was found that the odor of an article made from the blended composition can be significantly reduced or eliminated by compounding (extrusion) of the blended composition below a temperature of less than 185° C. and by injection molding articles from the blended compositions below a temperature of 195° C. There is no method for quantifying an odor. A nose evaluation on the pellets was done on articles that had been allowed to sit in open air for 24 hours. The strength of the odor correlated with the darkness of the samples (lower darkness (L) value indicates a greater darkness of the sample).

Example VI

The addition of fragrances to a blended composition was also evaluated to see if the burned popcorn odor could be masked. Injection molded samples (CEx. 4 and Ex. 21-23) were prepared. For the inventive examples (Ex. 21-23) mint, vanilla, and lemon concentrates were added to the blended compositions to evaluate the odor masking ability of those fragrances. The samples were injection molded at 200° C. and the molded articles were subjected to a nose evaluation. The results are shown in Table 7 below.

TABLE 7

|  | Description | Odor |
|---|---|---|
| CEx. 4 | Polymer C + 20% RH | Burned popcorn odor |
| Ex. 21 | Polymer C + 20% RH + 3% (1%) mint concentrate | Mint smell |
| Ex. 22 | Polymer C + 20% RH + 1% (3%) vanilla concentrate | Vanilla smell |
| Ex. 23 | Polymer C + 20% RH + 1% (3%) lemon concentrate | Lemon smell |

Examples 21-23 had only slight burned popcorn odor about 1 hr after molding. The burned popcorn odor disappeared after about 4 hr with only the odor of the mint, vanilla, or lemon concentrate odor remaining after about 4 hours. For comparative example CEx. 4 the burned popcorn order was strong and did not dissipate.

Example VII

Automotive door panels (Examples 24-26) were made with blended compositions and a comparative door panel (CEx. 5) was made without rice husk from thermoplastic copolymer B. The door panels were made with a Vandorn Caliber 3300. The fill pressure was about 9.1 MPa, the fill time was about 4.69 seconds, and the hold pressure was about 3.1 MPa. The compositions and melt temperatures used to manufacture the door panels are shown in Table 8 below.

TABLE 8

|  | Composition | Melt Temperature (° C.) |
|---|---|---|
| CEx. 5 | Copolymer B | 232 |
| Ex. 24 | C + 10% RH + 4% sand dune colorant | 193 |
| Ex. 25 | C + 10% RH + 4% black colorant | 193 |
| Ex. 26 | B + 40% RH concentrated blend in C diluted to final concentration of 10% RH + 4% black concentrate | 188 |

The results shown in Table 8 indicate that the blended compositions that include the rice husk can be used to manufacture automotive parts or articles on a commercial scale. The door panels for Examples 24-26 all had an excellent part appearance and had a grade A surface. The door panels were made with the standard colorants (sand dune and black) used in the automotive industry. The blended compositions used to make the door panels of Examples 24-26 had excellent processability and molding characteristics at a lower temperature than the comparative example CEx. 5. As such, the burned popcorn odor was avoided due to the ability of processing the blended compositions at temperatures less than 195° C. Accordingly, it has been surprisingly discovered that door panels can be manufactured from the blended compositions that meet or exceed the currently required physical properties while also exhibiting little to no burned popcorn odor.

Example VIII

Tumblers having an internal volume of 22 ounces were made with a blended composition that contained 20% rice husk in an impact copolymer and had a melt index ($I_2$) of 35. The tumblers were molded with a single cavity, air assist ejection, hot-runner tool on a 300 ton Husky injection molding machine. A very aggressive, general purpose screw with a mixing section was used. The wall thickness of the tumblers was 1.524 mm. The surface of the tumblers had a high gloss and did not show any burn marks. The processibility of the blended compositions was sufficient to allow the tumblers to be molded at temperatures as low as 177° C.

Example IX

The amount of water contained in the rice husk was evaluated to determine the effect moisture in the rice husk had on foaming during injection molding. Two blended compositions (CEx. 6 and Ex. 27) that both had 20 wt % rice husk in the homopolymer A shown in Table 1 above. The rice husk in CEx. 6 had a moisture content of 0.35 wt % and the rice husk in Ex. 27 had a moisture or water content of 0.17 wt %. The water content was measured by drying the samples in a heated oven at 105° C. for 6 hrs. The weight difference between the samples before and after drying indicated the water content. CEx. 6 exhibited foaming during injection molding. In contrast, the blended composition in Ex. 27 that had only 0.17 wt % water did not exhibit any foaming.

Example X

The scratch resistance of blended compositions that contained 10 wt % rice husk in thermoplastic copolymer C (Ex. 28 and 29) and a comparative example (CEx. 7) that contained 10 wt % inorganic filler in a commercial grade polyolefin elastomer (TPO) (AP3335HS) were tested. The AP3335HS polyolefin elastomer has been commonly used to manufacture automotive interior parts. The rice husk used in Examples 28 and 29 had a particle size of 100 μm and 300 μm, respectively. The inorganic filler had a particle size of 4 μm. The results are shown in Table 9 below.

TABLE 9

|  | CEx. 7 | Ex. 28 | Ex. 29 |
|---|---|---|---|
| Scratch Resistance (Newton) | 28.74 | 24 | 24.71 |
| Scratch Resistance (Newton) | 27.23 | 29 | 27.33 |
| Scratch Resistance (Newton) | 26.98 | 25.5 | 24.9 |
| Average (Newton) | 27.65 | 25.8 | 25.7 |
| STDEV | ±0.95 | ±2.00 | ±1.46 |

The results shown in Table 9 indicate the rice husk blends (Ex. 29 and 30) had a comparable scratch resistance to that of the comparative example CEx. 7. The rice husk blends of Examples 28 and 29 meet the scratch resistance requirements for interior automotive applications.

Example XI

A series of blended compositions (Ex. 30-34) were prepared by blending the polyolefin elastomer C (Ex. 30-33) and impact copolymer B (Ex. 34) with 10 wt % rice husk. Table 10 below shows the effect rice husk particle size had on a series of blended compositions.

TABLE 10

|  | Example | | | | |
|---|---|---|---|---|---|
|  | Ex. 30 | Ex. 31 | Ex. 32 | Ex. 33 | Ex. 34 |
| Composition | C + 10% RH | C + 10% RH | C + 10% RH | C + 10% RH | B + 10% RH |
| Rice husk particle size (micron) | 50 | 100 | 200 | 300 | 500 |
| Melt Flow (g/10 min) | 40 | 43 | 41 | 43 | 50 |
| Tensile Strength @ yield (MPa) | 20 | 20.1 | 19.7 | 19.8 | 24.3 |
| Elongation at yield (%) | 4.96 | 4.67 | 4.84 | 4.85 | 4.91 |
| Flexural Modulus(Tangent) (MPa) | 1,010 | 1,040 | 1,040 | 1,040 | 1,400 |
| Flexural Modulus(Secant 1%) (MPa) | 944 | 986 | 986 | 990 | 1340 |
| Notched Izod @ 23° C. (J/m) | 58.7 | 55.8 | 75 | 68.7 | 61.6 |
| Type of Break | 5CB | 5CB | 5CB | 5CB | 5CB |
| Yellowness Index, ASTM D6290-13 (pellets) | 68.1 | 59.8 | 62.6 | 61.1 | 61.3 |
| Yellowness Index, ASTM D1925-94 (plaques) | 98.6 | 90.5 | 80.7 | 81.2 | 91.9 |
| % Gloss (60°) | 51.3 | 32.1 | 30.2 | 25.8 | 74.8 |

The particle sizes of 50, 100, 200, 300, and 500 microns refer to rice husk particles that passed through sieves of 50, 100, 200, 300, and 500 micron, respectively. The particle size distribution was not measured. From Table 10 it can be seen that the particle size (50-500 micron) of the rice husk did not have a significant affect the toughness of the blended composition. As shown in Table 10, blends of 10% RH with the polyolefin elastomer (Ex. 30-33) and the impact copolymer (B) (Ex. 34) all exhibited good toughness (Notched Izod from about 56 J/m to about 75 J/m), when the rice husk particle size was varied from 50 micron to 500 micron. Also shown in Table 10, for a given copolymer matrix, the gloss is decreased as the rice husk particle size is increased. The blend in Example 34 had a higher tensile strength, flexural modulus and gloss than Examples 30-33 due to the copolymer matrix.

Visible rice husk particles were visible in example 24, where the rice husk had a particle size of 500 microns. Rice husk particles were not visible for Examples 30-33 where the rice husk had particles sizes of 50 microns, 100 microns, 200 microns, and 300 microns, respectively.

Example XII

A series of blended compositions (Ex. 35-45) were prepared by blending the polyolefin elastomer C with 10 wt % rice husk. Comparative examples CEx. 8 and 9 contained 10 wt % inorganic filler in a commercial grade polyolefin elastomer (TPO) (AP3335HS). The blended compositions were then injection molded. Examples Ex. 35, 37, 39, 41, 43, and 45, and CEx. 8 all had a textured surface. Examples Ex. 36, 38, 40, 42, and 44 and CEx. 9 all had a stippled surface. The textured surface was of a typical leather grain found in a car interior to simulate a leather surface. The textured surface was machined into the mold leaving the impression on the injection molded part. The cavity was engraved with the leather texture by Master Precision Products in Greenville Mich. The textured surface is also call a Chrysler-Miller grain. The stippled surface was a very light textured grain that was made in a similar fashion by the same company and provided low gloss finish. The stippled surface is also called a reverse camera grain. For Examples 35-45 the size of the rice husk blended with the polyolefin elastomer C varied from 100 microns to 300 microns and is shown in Table 11 below. Erucamide, in an amount of 3,000 ppm, was also added to the blended composition in Examples 40-45. Erucamide is a common slip agent or slip additive, typically added to copolymers for the manufacture of automobile parts such as door panels.

TABLE 11

| Example | Description of Sample | Onset Force (Newton) |
|---|---|---|
| Ex. 35 | 100 micron, textured | 10 |
| Ex. 36 | 200 micron, stippled | 10-15 |
| Ex. 37 | 200 micron, textured | 10 |
| Ex. 38 | 300 micron, stippled | 10 |
| Ex. 39 | 300 micron, textured | 7-10 |
| Ex. 40 | 100 micron, Erucamide, stippled | 15 |

TABLE 11-continued

| Example | Description of Sample | Onset Force (Newton) |
|---|---|---|
| Ex. 41 | 100 micron, Erucamide, textured | 10-15 |
| Ex. 42 | 200 micron, Erucamide, stippled | 15 |
| Ex. 43 | 200 micron, Erucamide, textured | 15 |
| Ex. 44 | 300 micron, Erucamide, stippled | 15 |
| Ex. 45 | 300 micron, Erucamide, textured | 10-15 |
| CEx. 8 | AP3335HS, textured | 10 |
| CEx. 9 | AP3335 HS, stippled | 10-15 |

Scratch resistance was measured for Examples 35-45 and comparative examples CEx. 8 and 9 according to the Ford Five Finger Standard Test (Test Number BN-108-13). It was surprisingly and unexpectedly discovered that the blended compositions in Examples 35-39 that did not include Erucamide exhibited similar scratch resistance as the commercial grade AP3335HS and the blended compositions of Examples 40-45 that did include Erucamide.

Example XIII

Three blended compositions that included the polyolefin elastomer C and 20 wt % rice husk (Ex. 46-48) and one comparative example (CEx. 10) that included the polyolefin elastomer, but no rice husk, were prepared. Black concentrate acquired from Americhem and having product code 5B8A was added to all of the examples. Eurcamide, as a slip agent, was added to the blended compositions of Examples 46 and 47 and the comparative example CEx. 10. A nucleator HIS-5 (the concentrate of Hyperform HPN-68L available from Milliken) was also added to Examples 46 and 48. The relative amounts of each component are shown in Table 12 below.

TABLE 12

| | Composition (wt %) | | | | |
|---|---|---|---|---|---|
| Example | 20% RH blend | TPO C | Black concentrate | Erucamide | HIS-5 |
| Ex. 46 | 94.2 | 0 | 4 | 0.3 | 1.5 |
| Ex. 47 | 95.7 | 0 | 4 | 0.3 | 0 |
| Ex. 48 | 94.5 | 0 | 4 | 0 | 1.5 |
| CEx. 10 | 0 | 95.7 | 4 | 0.3 | 0 |

The blended compositions of Examples 46-48 and CEx. 10 were injection molded to produce test samples. Pellets of the mixture of additive and rice husk blend were formed in to test samples with a SUMMITOMO SE100 D injection molding machine. The test samples were prepared according to ASTM D4101-14. The melt temperature of the blended composition during preparation of the test samples was 190° C. Plaques that had a dimension of ⅛ inch by 4 inches by 6 inches were used for the mold shrinkage test. Family mold specimens were used for other tests listed in Table 13. The ASTM methods used to measure the properties shown in Table 13 are listed in Table 16.

Table 13 below shows the measured properties for the injection molded samples.

TABLE 13

| | Sample | | | |
|---|---|---|---|---|
| | Ex. 46 | Ex. 47 | Ex. 48 | CEx. 10 |
| Melt Flow (g/10 mm) | 27 | 26 | 25 | 32 |
| Tensile Strength @ yield (MPa) | 19.1 | 18.9 | 19.3 | 19.4 |
| Elongation @ yield (%) | 2.68 | 2.83 | 2.63 | 6.67 |
| Flexural Modulus(Tangent) (MPa) | 1,460 | 1,410 | 1,480 | 807 |
| Flexural Modulus(Secant 1%) (MPa) | 1,390 | 1,340 | 1,400 | 783 |
| Notched Izod @ 23° C. (J/m) | 35.6 | 36.8 | 34.8 | 581 |
| Type of Break | 5CB | 1P/4CB | 5CB | SNB |
| L* (plaques) | 12.5 | 12.6 | 13.6 | 6.8 |
| a*(plaques) | 0.12 | 0 | 0 | 0.11 |
| b*(plaques) | −0.12 | −0.1 | −0.13 | −0.2 |
| Delta E | 6.43 | 5.86 | 6.67 | |
| Yellowness Index, ASTM D1925-94 (plaques) | −0.52 | −0.81 | −0.95 | −1.71 |
| % Gloss (60°) | 24.5 | 20.9 | 25.6 | 76.7 |
| Mold Shrinkage after 48 h at 23° C. (Flow direction) (%) | 1.2293 | 1.1944 | | 1.3566 |
| Mold Shrinkage after 48 h at 23° C. (Cross-flow direction) (%) | 1.1375 | 1.0781 | | 1.2394 |
| Warpage Tendency | 0.0918 | 0.1163 | | 0.1172 |

The results shown in Table 13 indicate that that rice husk can significantly reduce the shrinkage and slightly reduce the warpage tendency. The warpage tendency can be estimated by subtracting the mold shrinkage in the flow direction from the mold shrinkage in the cross-flow direction. Low warpage and low shrinkage are good properties for making parts or articles via injection molding, especially for automotive applications and the reduction in shrinkage and the slight reduction in warpage tendency were surprising and unexpected Also shown in Table 13, Ex. 46 (included erucamide) had a higher melt flow rate than Ex. 48 (did not include erucamide). This suggests that the erucamide improves the processability of the blended compositions that include the rice husk.

Example XIV

An inventive example (Ex. 49) that was a concentrated blend of 40 wt % rice husk in copolymer C was prepared. Inventive examples 50-56 were prepared by blending a sample of Example 49 with homopolymer A or copolymers D or B, depending on the particular example. The particular compositions for Examples 49-56 are shown in Table 14 below.

TABLE 14

| Example | Description |
|---|---|
| 49 | Concentrated of 40% RH in copolymer C |
| 50 | 25% RH blend made by letting down sample 49 with copolymer D with an injection molding machine (weight ratio of sample 49 to D is 1.67:1) |
| 51 | 20% RH blend made by letting down sample 49 with copolymer C with an injection molding machine (weight ratio of sample 49 to D is 1:1) |
| 52 | 10% RH blend made by letting down sample 49 with copolymer C with an injection molding machine (weight ratio of sample 49 to D is 1:3) |
| 53 | 20% RH blend made by letting down sample 49 with homopolymer A with an injection molding machine (weight ratio of sample 49 to A is 1:1) |
| 54 | 10% RH blend made by letting down sample 49 with homopolymer A with an injection molding machine (weight ratio of sample 49 to A is 1:3) |
| 55 | 20% RH blend made by letting down sample 49 with copolymer B with an injection molding machine (weight ratio of sample 49 to B is 1:1) |
| 56 | 20% RH blend made by letting down sample 49 with copolymer B with an injection molding machine (weight ratio of sample 49 to B is 1:3) |

The mechanical and thermal properties and density for Examples 49-56 are shown in Table 15. Pellets of the concentrate and the letdown polymer were dry blended. Pellets of the blended composition were then formed into test samples with SUMMITOMO SE100 D injection molding machine. The test samples were prepared according to ASTM D4101-14. The melt temperature of the blended composition during preparation of the test samples was 190° C.

TABLE 15

| | Example number | | | | | | | |
|---|---|---|---|---|---|---|---|---|
| | 49 | 50 | 51 | 52 | 53 | 54 | 55 | 56 |
| Composition | 40% RH in C | 25% RH in C + D | 20% RH in C + D | 10% RH in C + D | 20% RH in C + A | 10% RH in C + A | 20% RH in C + B | 10% RH in C + B |
| Melt Flow (g/10 min) | 16 | 18 | 16 | 13 | 33 | 27 | 32 | 22 |
| Density (kg/m3) | 1,060 | 959 | 986 | 928 | 972 | 938 | 971 | 931 |
| Specific Gravity | 1.06 | 0.962 | 0.988 | 0.93 | 0.974 | 0.941 | 0.973 | 0.933 |
| Tensile Strength @ yield (MPa) | 14.5 | 15.5 | 15.7 | 16.6 | 23.5 | 30.1 | 19.7 | 22.1 |
| Elongation @ yield (5%) | 2.66 | 3.47 | 4.24 | 4.94 | 4.55 | 6.1 | 3.47 | 4.02 |
| Flexural Modulus (Tangent) (MPa) | 1,820 | 1,380 | 1,210 | 1,050 | 1,730 | 1,770 | 1,600 | 1,470 |
| Flexural Modulus (Secant 1%) (MPa) | 1,640 | 1,280 | 1,130 | 971 | 1,630 | 1,690 | 1,510 | 1,400 |
| Notched Izod @ 23° C. (J/m) | 33.6 | 58.3 | 79.5 | 167 | 21.7 | 22 | 40.2 | 49.2 |
| Type of Break | 5CB | 5PB | 5PB | 5NB | 5CB | 5CB | 5CB | 5CB |
| HDT @ 0.455 MPa (° C.) | 119 | 102 | 97 | 85 | 113 | 112 | 114 | 106 |
| HDT @ 1.82 MPa (° C.) | 69 | 64 | 67 | 67 | 85 | 80 | 77 | 71 |
| Rockwell Hardness (R) | 62 | 58 | 53 | 46 | 90 | 97 | 79 | 82 |
| Yellowness Index ASTM D1925-94 (plaques) | — | 97.9 | 95.9 | 87.5 | 102 | 102 | — | — |

TABLE 15-continued

| | Example number | | | | | | | |
|---|---|---|---|---|---|---|---|---|
| | 49 | 50 | 51 | 52 | 53 | 54 | 55 | 56 |
| % Gloss (60°) | — | 56.2 | 52.3 | 51.1 | 67.7 | 77.9 | — | — |
| Mold Shrinkage after 48 h at 23° C. (Flow direction) (%) | — | 1.0511 | 1.0675 | 1.3831 | 1.1979 | 1.1959 | — | — |
| Mold Shrinkage (Cross-flow) (%) | — | 0.9886 | 1.0925 | 1.4088 | 1.2679 | — | — | — |
| Major Melting Point, $T_{m1}$ (° C.) | 163.1 | 163.7 | 163.5 | 163.9 | 163 | 163.6 | 165.1 | 164.4 |
| Major Heat of Fusion (J/g) | 52.5 | 54.1 | 55.3 | 59.1 | 73 | 85.1 | 65.6 | 73.2 |
| Major Crystallization Temp. $T_{c1}$ (° C.) | 120.2 | 121.8 | 120.7 | 121.8 | 120.8 | 124.8 | 128.5 | 128.1 |
| Major Heat of Crystallization (J/g) | −53 | −55.4 | −56.6 | −62.2 | −73.6 | −86.3 | −68.8 | −79.9 |

The blend of the RH concentrate with polymer D would be satisfactory for use in applications that require high toughness (high notched Izod). The blend of the RH concentrate with homopolymer A would be satisfactory for use in applications that requires high modulus. The blend of the RH concentrate with polymer B would be satisfactory for applications that require a balance of modulus and toughness.

Example XV

We have found that the odor of the rice husk master batch and its molded parts can be reduced significantly by using a random copolymer as a base resin to make the master batch. The master batch can be let down using one or more impact copolymers and/or one or more thermoplastic copolymers to make the final blend that has a suitable toughness. The results in Table 16 below show the mechanical properties of a 10% RH blend made from a 40% RH master batch that used a random copolymer (Copolymer F in Table 1) that had an MFR of 35 and contained 3.2 wt % ethylene. The 40% RH master batch was let down with an impact copolymer that had a MFR of 20 and ethylene-propylene rubber ("EPR") content of 19%. Two molded examples were prepared, namely, (Ex. 57 and Ex. 58), that were molded at a temperature of 170° C. and 180° C., respectively.

TABLE 16

| | Sample | |
|---|---|---|
| | Ex. 57 | Ex. 58 |
| Molding Temperature (° C.) | 170 | 180 |
| Melt Flow on part (g/10 min) | N/M | 44 |
| Tensile Strength at yield (MPa) | 19.8 | 19.4 |
| Elongation at yield (%) | 7.04 | 7.24 |
| Flexural Modulus(Tangent) (MPa) | 1,160 | 1,130 |
| Flexural Modulus(Secant 1%) (MPa) | 1,050 | 1,020 |
| Notched Izod @ 23° C., molded at 170° C. (J/m) | 72.7 | 70.2 |
| Type of Break | 10CB | 10 CB |
| Yellowness Index, ASTM D1925-94 (plaques) | 79.8 | 81.9 |

The letdown sample from the master batch made with the random copolymer had a much lower odor as compared to a letdown sample from a master batch made with an impact copolymer C (Ex. 15), but Ex. 57 had comparable mechanical properties to Ex. 15. Without wishing to be bound by theory, it is believed that the low odor of Ex. 57 may be due to the lower melting temperature of the random copolymer (melt temperature of about 150° C.) as compared to the melting temperature of impact copolymer (melt temperature of about 160° C.). The low crystalline melting temperature of the random copolymer seems to allow the master batch to be extruded at a lower temperature (160° C. to 170° C.) and thus reduced the odor that was generated during processing. Ex. 58 had the same composition as Ex. 57, but was molded at a temperature of about 180° C. Ex. 57 (molded at 170° C.) had the same mechanical properties as Ex. 58 (molded at 180° C.), but Ex. 57 had a lower odor than Ex. 58. The Yellowness Index of Ex. 58 was lower than Ex. 58, and also indirectly suggests that Ex. 57 had a lower odor than Ex. 58.

Without wishing to be bound by theory, it is believed that the preferred range of crystalline melting temperature of a random copolymer is about 130° C. to about 155° C., e.g., about 140° C. to about 152° C. and the preferred co-monomers can be ethylene and/or butene. Without wishing to be bound by theory, it is believed that the preferred total ethylene content of the letdown sample (including random and impact copolymers) can be about 4 wt % to about wt %, e.g., about 6 wt % to about 15 wt % and the preferred processing temperature range (extrusion and molding) can be about 160° C. to about 190° C., e.g., about 165° C. to about 180° C.

The test methods used to measure the properties shown in Tables 1-16 are listed in Table 17 below.

TABLE 17

| TESTS | Cond./Speed | ASTM Method |
|---|---|---|
| Conditioning for physical tests | | D618-13 |
| Melt Flow ($I_2$) | 230° C./ 2.16 kg | D1238-13, Procedure B (at 230° C. and 2.16 kg) |
| Density | D23 | D792-13, Test Method A |
| Specific Gravity | 23/23° C. | D792-13, Test Method A |
| Tensile Strength @ yield | 50 mm/min | D638-10 |
| Elongation @ yield | 50 mm/min | D638-10 |
| Flexural Modulus(Tangent) | 1.3 mm/min | D790-10, Procedure A |
| Flexural Modulus(Secant 1%) | 1.3 mm/min | D790-10, Procedure A |
| Notched Izod @ 23° C. | 23° C. | D256-10 |
| HDT @ 0.455 MPa | 2° C./min | D648-07 |
| HDT @ 1.82 MPa | 2° C./min | D648-07 |
| Rockwell Hardness | | D785-08 |
| Yellowness Index | Plaques | D1925-94 (withdrawn in 1995) |
| Yellowness Index | Pellets | D6290-13 |
| % Gloss (60°) | 60° | D523-14 |
| Mold Shrinkage after 48 hr at 23° C. (Flow direction) | 48 h/23° C. | D955-08(2014) |

TABLE 17-continued

| TESTS | Cond./Speed | ASTM Method |
|---|---|---|
| Mold Shrinkage after 48 hr at 23° C. (Cross-flow direction) | 48 h/23° C. | D955-08(2014) |
| Major Melting Point, $T_{m1}$ | | D3418-12e1 |
| Major Heat of Fusion | | D3418-12e1 |
| Major Crystallization Temp. $T_{c1}$ | | D3418-12e1 |
| Major Heat of Crystallization | | D3418-12e1 |

Embodiments of the present disclosure further relate to any one or more of the following paragraphs:

1. A blended composition, comprising a thermoplastic copolymer and an organic filler, the blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the thermoplastic copolymer comprises a blend of a polypropylene homopolymer and a copolymer of propylene and a comonomer, the comonomer comprises ethylene, a $C_4$ to $C_{20}$ olefin, or any mixture thereof, the copolymer of propylene and the comonomer comprises about 0.5 wt % to about 40 wt % of the comonomer, and the blended composition comprises about 5 wt % to about 30 wt % of the organic filler based on the combined weight of the thermoplastic copolymer and the organic filler.

2. A method for making a blended composition, comprising blending a thermoplastic copolymer and an organic filler to produce a blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the thermoplastic copolymer comprises a blend of a polypropylene homopolymer and a copolymer of propylene and a comonomer, the comonomer comprises ethylene, a $C_4$ to $C_{20}$ olefin, or any mixture thereof, the copolymer of propylene and the comonomer comprises about 0.5 wt % to about 40 wt % of the comonomer, and the blended composition comprises about 5 wt % to about 30 wt % of the organic filler based on the combined weight of the thermoplastic copolymer and the organic filler.

3. An article, comprising a blended composition comprising a thermoplastic copolymer and an organic filler, the blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the thermoplastic copolymer comprises a blend of a polypropylene homopolymer and a copolymer of propylene and a comonomer, the comonomer comprises ethylene, a $C_4$ to $C_{20}$ olefin, or any mixture thereof, the copolymer of propylene and the comonomer comprises about 0.5 wt % to about 40 wt % of the comonomer, and the blended composition comprises about 5 wt % to about 30 wt % of the organic filler based on the combined weight of the thermoplastic copolymer and the organic filler.

4. A blended composition comprising a thermoplastic copolymer, an organic filler, and a pigment, the blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the thermoplastic copolymer comprises a blend of a polypropylene homopolymer and a copolymer of propylene and a comonomer, the comonomer comprises ethylene, a $C_4$ to $C_{20}$ olefin, or any mixture thereof, the copolymer of propylene and the comonomer comprises about 0.5 wt % to about 40 wt % of the comonomer, the blended composition comprises about 0.5 wt % to about 5 wt % of the pigment, based on the combined weight of the thermoplastic copolymer, the organic filler, and the pigment; about 2% to about 50% of the organic filler has a particle size of about 200 μm to about 1,000 μm, and the blended composition comprises about 5 wt % to about 30 wt % of the organic filler based on the combined weight of the thermoplastic copolymer and the organic filler.

5. A method for making a blended composition, comprising: blending a first thermoplastic copolymer with a concentrated blend to produce a blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the first thermoplastic copolymer comprises a blend of a first polypropylene homopolymer and a first copolymer of propylene and a first comonomer, the first comonomer comprises ethylene, a $C_4$ to $C_{20}$ olefin, or any mixture thereof, the first copolymer of propylene and the first comonomer comprises about 0.5 wt % to about 40 wt % of the first comonomer, the concentrated blend comprises: (1) a second thermoplastic copolymer and greater than 30 wt % to about 55 wt % of an organic filler, based on the combined weight of the second thermoplastic copolymer and the organic filler, (2) a second polypropylene homopolymer and greater than 30 wt % to about 55 wt % of an organic filler, based on the combined weight of the second polypropylene homopolymer and the organic filler, or (3) a second thermoplastic copolymer, a second polypropylene homopolymer, and greater than 30 wt % to about 55 wt % of an organic filler, based on the combined weight of the second thermoplastic copolymer, the second polypropylene homopolymer, and the organic filler, and wherein the blended composition comprises about 5 wt % to about 30 wt % of the organic filler, based on the combined weight of the first thermoplastic copolymer and the concentrated blend.

6. The blended composition, method, or article according to any one of paragraphs 1 to 5, wherein the organic filler comprises one or more grain husks, one or more fruit husks, one or more nut shells, one or more bean husks, wood, or any mixture thereof.

7. The blended composition, method, or article according to any one of paragraphs 1 to 6, wherein the organic filler comprises rice husk, wheat husk, corn husk, pecan flour, or any mixture thereof.

8. The blended composition, method, or article according to any one of paragraphs 1 to 7, wherein the organic filler comprises rice husk.

9. The blended composition, method, or article according to any one of paragraphs 1 to 8, wherein the blended composition has a melt index greater than 5 g/10 min to about 70 g/10 min as measured according to ASTM D1238-13, procedure B (at 230° C. and 2.16 kg weight).

10. The blended composition, method, or article according to any one of paragraphs 1 to 9, wherein the blended composition has a melt index greater than 7 g/10 min to about 45 g/10 min as measured according to ASTM D1238-13, procedure B (at 230° C. and 2.16 kg weight).

11. The blended composition, method, or article according to any one of paragraphs 1 to 10, wherein the blended composition has a melt index of greater than 10 g/10 min to about 35 g/10 min as measured according to ASTM D1238-13, procedure B (at 230° C. and 2.16 kg weight).

12. The blended composition, method, or article according to any one of paragraphs 1 to 9, wherein the blended composition has a melt index of greater than 19 g/10 min to about 55 g/10 min, as measured according to ASTM D1238-13, procedure B (at 230° C. and 2.16 kg weight).

13. The blended composition, method, or article according to any one of paragraphs 1 to 9, wherein the blended composition has a melt index of greater than 8 g/10 min, greater than 15 g/10 min, greater than 20 g/10 min, greater than 22 g/10 min, greater than 25 g/10 min, greater than 27 g/10 min, or greater than 30 g/10 min to about 40 g/10 min, about 50 g/10 min, about 60 g/10 min, about 70 g/10 min, about 80 g/10 min, or about 90 g/10 min, as measured according to ASTM D1238-13, procedure B (at 230° C. and 2.16 kg weight).

14. The blended composition, method, or article according to any one of paragraphs 1 to 13, wherein the blended composition has a Notched Izod Impact Strength of at least 26.7 J/m to about 450 J/m, as measured according to ASTM D256-10.

15. The blended composition, method, or article according to any one of paragraphs 1 to 14, wherein the blended composition has a Notched Izod Impact Strength of at least 30 J/m to about 400 J/m, as measured according to ASTM D256-10.

16. The blended composition, method, or article according to any one of paragraphs 1 to 15, wherein the blended composition has a Notched Izod Impact Strength of at least 35 J/m, at least 40 J/m, at least 45 J/m, at least 50 J/m, at least 55 J/m, at least 60 J/m, at least 65 J/m, at least 70 J/m, or at least 75 J/m to about 400 J/m, about 450 J/m, about 500 J/m, about 550 J/m, or about 600 J/m, as measured according to ASTM D256-10.

17. The blended composition, method, or article according to any one of paragraphs 1 to 4 or 6 to 16, wherein the copolymer of propylene and the comonomer comprises about 0.5 wt % to about 6 wt % of the comonomer.

18. The blended composition, method, or article according to any one of paragraphs 1 to 4 or 6 to 16, wherein the copolymer of propylene and the comonomer comprises at least 6.1 wt % to about 16 wt % of the comonomer.

19. The blended composition, method, or article according to any one of paragraphs 1 to 4 or 6 to 16, wherein the copolymer of propylene and the comonomer comprises about 14 wt % to about 40 wt % of the comonomer.

20. The method according to any one of paragraphs 5 to 16, wherein the first copolymer of propylene and the first comonomer comprises about 0.5 wt % to about 6 wt % of the first comonomer.

21. The method according to any one of paragraphs 5 to 16, wherein the first copolymer of propylene and the first comonomer comprises at least 6.1 wt % to about 20 wt % of the first comonomer.

22. The method according to any one of paragraphs 5 to 16, wherein the first copolymer of propylene and the first comonomer comprises about 14 wt % to about 40 wt % of the first comonomer.

23. The blended composition, method, or article according to any one of paragraphs 1 to 22, wherein the organic filler contains less than 0.2 wt % water.

24. The blended composition, method, or article according to any one of paragraphs 1 to 4 or 6 to 23, wherein the thermoplastic copolymer is blended with the organic filler at a temperature less than or equal to 195° C.

25. The blended composition, method, or article according to any one of paragraphs 1 to 4 or 6 to 24, wherein the thermoplastic copolymer is blended with the organic filler at a temperature less than or equal to 190° C.

26. The blended composition, method, or article according to any one of paragraphs 1 to 4 or 6 to 25, wherein the thermoplastic copolymer is blended with the organic filler at a temperature less than or equal to 185° C.

27. The blended composition, method, or article according to any one of paragraphs 1 to 4 or 6 to 26, wherein the thermoplastic copolymer is blended with the organic filler at a temperature less than or equal to 180° C.

28. The blended composition, method, or article according to any one of paragraphs 1 to 4 or 6 to 27, wherein the thermoplastic copolymer is blended with the organic filler at a temperature less than or equal to 175° C.

29. The blended composition, method, or article according to any one of paragraphs 1 to 4 or 6 to 28, wherein the thermoplastic copolymer is blended with the organic filler at a temperature less than or equal to 170° C.

30. The blended composition, method, or article according to any one of paragraphs 1 to 29, wherein the blended composition further comprises one or more fragrances.

31. The blended composition, method, or article according to paragraph 30, wherein the fragrance comprises a fruit concentrate.

32. The blended composition, method, or article according to paragraph 30, wherein the fragrance comprises coffee.

33. The blended composition, method, or article according to paragraph 30, wherein the fragrance comprises mint concentrate, lemon concentrate, lime concentrate, orange concentrate, vanilla concentrate, coffee, or any mixture thereof.

34. The blended composition, method, or article according to any one of paragraphs 30 to 33, wherein the blended composition comprises about 0.5 wt % to about 5 wt % of the fragrance, based on the combined weight of the thermoplastic copolymer, the organic filler, and the fragrance.

35. The blended composition, method, or article according to any one of paragraphs 1 to 34, wherein the organic filler has a particle size of less than 1,000 μm.

36. The blended composition, method, or article according to any one of paragraphs 1 to 35, wherein the organic filler has a particle size of less than 1,000 μm, and at least 70 wt % of the organic filler has a particle size of less than 200 μm.

37. The blended composition, method, or article according to any one of paragraphs 1 to 36, wherein about 60 wt % to about 80 wt % of the organic filler has a particle size of less than about 100 μm and about 20 wt % to about 40 wt % of the organic filler has an particle size of about 100 μm to about 1,000 μm.

38. The blended composition, method, or article according to any one of paragraphs 1 to 37, wherein about 2% to about 50% of the organic filler has a particle size of about 400 μm to about 1,000 μm.

39. The blended composition, method, or article according to any one of paragraphs 1 to 38, wherein about 2% to about 50% of the organic filler has a particle size of about 200 μm to about 800 μm.

40. The blended composition, method, or article according to any one of paragraphs 1 to 39, wherein about 5% to about 30% of the organic filler has a particle size of about 400 μm to about 1,000 μm.

41. The blended composition, method, or article according to any one of paragraphs 1 to 40, wherein about 10% to about 25% of the organic filler has a particle size of about 400 μm to about 1,000 μm.

42. The blended composition, method, or article according to any one of paragraphs 1 to 41, wherein the blended composition comprises about 5 wt % to about 15 wt % of the organic filler based on the combined weight of the thermoplastic copolymer and the organic filler, and wherein about 10 wt % to about 30 wt % of the organic filler has a particle size of about 200 μm to about 1,000 μm.

43. The blended composition, method, or article according to any one of paragraphs 1 to 42, wherein the blended composition comprises about 5 wt % to about 15 wt % of the organic filler based on the combined weight of the thermoplastic copolymer and the organic filler, and wherein about 10 wt % to about 30 wt % of the organic filler has a particle size of about 400 μm to about 1,000 μm.

44. The blended composition, method, or article according to any one of paragraphs 1 to 43, wherein the blended composition has a granite-like appearance.

45. The blended composition, method, or article according to any one of paragraphs 4 or 6 to 44, wherein the one or more pigments comprise titanium dioxide, calcium carbonate, zinc oxide, talc, kaolin, wollastonite, or any mixture thereof.

46. The blended composition, method, or article according to any one of paragraphs 1 to 4 or 6 to 45, wherein the comonomer comprises ethylene.

47. The blended composition, method, or article according to any one of paragraphs 5 to 16, 20 to 23, or 30 to 46, wherein the comonomer comprises ethylene.

48. The blended composition, method, or article according to any one of paragraphs 1 to 4, 6 to 19, or 23 to 46, wherein the thermoplastic copolymer comprises about 5 wt % to about 40 wt % of the copolymer of propylene and the comonomer, based on the combined weight of the polypropylene homopolymer and the copolymer of propylene and the comonomer.

49. The blended composition, method, or article according to any one of paragraphs 1 to 4, 6 to 19, or 23 to 46, wherein the thermoplastic copolymer comprises about 8 wt % to about 30 wt % of the copolymer of propylene and the comonomer, based on the combined weight of the polypropylene homopolymer and the copolymer of propylene and the comonomer.

50. The blended composition, method, or article according to any one of paragraphs 1 to 4, 6 to 19, or 23 to 46, wherein the thermoplastic copolymer comprises about 8 wt % to about 25 wt % of the copolymer of propylene and the comonomer, based on the combined weight of the polypropylene homopolymer and the copolymer of propylene and the comonomer.

51. A concentrated blend comprising a thermoplastic copolymer and an organic filler, the concentrated blend having a Notched Izod Impact Strength of at least 10 J/m to about 300 J/m, as measured according to ASTM D256-10, and a melt index of about 5 g/10 min to about 100 g/10 min, as measured according to ASTM D1238-13, procedure B (at 230° C. and 2.16 kg weight), wherein: the thermoplastic copolymer comprises: (A) a blend of a polypropylene homopolymer and a first copolymer of propylene and a first comonomer, wherein the first comonomer comprises ethylene, a $C_4$ to $C_{20}$ olefin, or any mixture thereof, and wherein the first copolymer comprises about 0.5 wt % to about 40 wt % of the first comonomer, or (B) a second copolymer of propylene and a second comonomer, wherein the second comonomer comprises ethylene, a $C_4$ to $C_{20}$ olefin, or any mixture thereof, and wherein the second copolymer comprises about 0.5 wt % to about 6 wt % of the second comonomer, and the concentrated blend comprises at least 30 wt % to about 55 wt % of the organic filler, based on the combined weight of the thermoplastic copolymer and the organic filler.

52. A method for making a concentrated blend, comprising: blending a thermoplastic copolymer and an organic filler to produce a concentrated blend having a Notched Izod Impact Strength of at least 10 J/m to about 300 J/m, as measured according to ASTM D256-10, and a melt index of about 5 g/10 min to about 100 g/10 min, as measured according to ASTM D1238-13, procedure B (at 230° C. and 2.16 kg weight), wherein: the thermoplastic copolymer comprises A) a blend of a polypropylene homopolymer and a first copolymer of propylene and a first comonomer, wherein the first comonomer comprises ethylene, a $C_4$ to $C_{20}$ olefin, or any mixture thereof, and wherein the first copolymer comprises about 0.5 wt % to about 40 wt % of the first comonomer, or (B) a second copolymer of propylene and a second comonomer, wherein the second comonomer comprises ethylene, a $C_4$ to $C_{20}$ olefin, or any mixture thereof, and wherein the second copolymer comprises about 0.5 wt % to about 6 wt % of the second comonomer, and the concentrated blend comprises at least 30 wt % to about 55 wt % of the organic filler, based on the combined weight of the thermoplastic copolymer and the organic filler.

53. The concentrated blend or method according to paragraph 51 or 52, wherein the organic filler comprises one or more grain husks, one or more fruit husks, one or more nut shells, one or more bean husks, wood, or any mixture thereof.

54. The concentrated blend or method according to any one of paragraphs 51 to 53, wherein the organic filler comprises rice husk, wheat husk, corn husk, pecan flour, or any mixture thereof.

55. The concentrated blend or method according to any one of paragraphs 51 to 54, wherein the organic filler comprises rice husk.

56. The concentrated blend or method according to any one of paragraphs 51 to 55, wherein the thermoplastic copolymer comprises the second copolymer.

57. The concentrated blend or method according to any one of paragraphs 51 to 55, wherein the thermoplastic copolymer comprises the blend of the polypropylene homopolymer and the first copolymer of propylene and the first comonomer.

58. The concentrated blend or method according to any one of paragraphs 51 to 55, wherein the thermoplastic copolymer comprises the blend of the polypropylene homopolymer and the first copolymer of propylene and the first comonomer, and wherein first copolymer comprises about 6.1 wt % to about 40 wt % of the first comonomer.

59. The concentrated blend or method according to any one of paragraphs 51 to 58, wherein the comonomer comprises ethylene.

60. The concentrated blend or method according to any one of paragraphs 51 to 59, wherein the organic filler contains less than 0.2 wt % water.

61. The concentrated blend or method according to any one of paragraphs 51 to 60, wherein the thermoplastic copolymer and the organic filler are blended at a temperature of less than 195° C.

62. The concentrated blend or method according to any one of paragraphs 51 to 61, wherein the thermoplastic copolymer and the organic filler are blended at a temperature of less than 190° C.

63. The concentrated blend or method according to any one of paragraphs 51 to 62, wherein the thermoplastic copolymer and the organic filler are blended at a temperature of less than 185° C.

64. The concentrated blend or method according to any one of paragraphs 51 to 63, wherein the thermoplastic copolymer and the organic filler are blended at a temperature of less than 180° C.

65. The concentrated blend or method according to any one of paragraphs 51 to 64, wherein the thermoplastic copolymer and the organic filler are blended at a temperature of less than 175° C.

66. The concentrated blend or method according to any one of paragraphs 51 to 65, wherein the thermoplastic copolymer and the organic filler are blended at a temperature of less than 170° C.

67. The concentrated blend or method according to any one of paragraphs 51 to 66, wherein the blended composition further comprises one or more fragrances.

68. The concentrated blend or method according to paragraph 67, wherein the fragrance comprises a fruit concentrate.

69. The concentrated blend or method according to paragraph 67, wherein the fragrance comprises coffee.

70. The concentrated blend or method according to paragraph 67, wherein the fragrance comprises mint concentrate, lemon concentrate, lime concentrate, orange concentrate, vanilla concentrate, coffee, or any mixture thereof.

71. The concentrated blend or method according to any one of paragraphs 67 to 70, wherein the blended composition comprises about 0.5 wt % to about 5 wt % of the fragrance based on the combined weight of the thermoplastic copolymer, the organic filler, and the fragrance.

72. The concentrated blend or method according to any one of paragraphs 51 to 71, wherein the organic filler has a particle size of less than 1,000 μm.

73. The concentrated blend or method according to any one of paragraphs 51 to 72, wherein the organic filler has a particle size of less than 1,000 μm, and at least 70 wt % of the organic filler has a particle size of less than 200 μm.

74. The concentrated blend or method according to any one of paragraphs 51 to 72, wherein the organic filler comprises about 60 wt % to about 80 wt % particles having a size of less than about 100 μm and about 20 wt % to about 40 wt % of particles having a size of about 100 μm to about 1,000 μm.

75. The blended composition, method, article, or concentrated blend according to any one of paragraphs 1 to 74, wherein at least 50 wt % of the organic filler is rice husk.

76. The blended composition, method, article, or concentrated blend according to any one of paragraphs 1 to 74, wherein at least 75 wt % of the organic filler is rice husk.

77. The blended composition, method, article, or concentrated blend according to any one of paragraphs 1 to 74, wherein the organic filler consists essentially of rice husk.

78. The blended composition, method, article, or concentrated blend according to any one of paragraphs 1 to 74, wherein the organic filler consists of rice husk.

79. The blended composition, method, article, or concentrated blend according to any one of paragraphs 1 to 78, wherein the blended composition comprises about 5 wt % to about 15 wt % of the organic filler based on the combined weight of the thermoplastic copolymer and the organic filler.

80. The blended composition, method, article, or concentrated blend according to any one of paragraphs 1 to 78, wherein the blended composition comprises about 10 wt % to about 20 wt % of the organic filler based on the combined weight of the thermoplastic copolymer and the organic filler.

81. The blended composition, method, article, or concentrated blend according to any one of paragraphs 1 to 78, wherein the blended composition comprises about 17 wt % to about 25 wt % of the organic filler based on the combined weight of the thermoplastic copolymer and the organic filler.

82. The blended composition, method, article, or concentrated blend according to any one of paragraphs 1 to 78, wherein the blended composition comprises about 21 wt % to about 29 wt % of the organic filler based on the combined weight of the thermoplastic copolymer and the organic filler.

83. The article according to any one of paragraphs 3, 6 to 19, 23 to 46, or 75 to 82, wherein the article is a counter top, a tumbler, or a plate.

84. The article according to any one of paragraphs 3, 6 to 19, 23 to 46, or 75 to 82, wherein the article is an automotive component.

85. The article according to any one of paragraphs 3, 6 to 19, 23 to 46, or 75 to 82, wherein the article is an automotive body panel.

86. The article according to any one of paragraphs 3, 6 to 19, 23 to 46, or 75 to 82, wherein the article has a granite-like appearance.

87. The article according to any one of paragraphs 3, 6 to 19, 23 to 46, or 72 to 82, wherein the article has a textured surface.

88. A blended composition comprising one or more thermoplastics, one or more organic fillers, and one or more pigments, wherein the blended composition has a granite-like appearance, and wherein the one or more thermoplastics comprise one or more homopolymers, one or more copolymers, or any mixture thereof.

89. A blended composition comprising one or more thermoplastics, one or more organic fillers, and one or more pigments, wherein the blended composition is used as a counter top, and wherein the one or more thermoplastics comprise one or more homopolymers, one or more copolymers, or any mixture thereof.

90. A blended composition comprising one or more thermoplastics, one or more organic fillers, and one or more pigments, wherein the blended composition has a granite-like appearance, wherein the blended composition is used as a counter top, and wherein the one or more thermoplastics comprise one or more homopolymers, one or more copolymers, or any mixture thereof.

91. A blended composition comprising one or more thermoplastics, one or more organic fillers, and one or more pigments, wherein the blended composition comprises about 5 wt % to about 30 wt % of the organic filler based on the combined weight of the thermoplastic and the organic filler, wherein about 2% to about 50% of the organic filler has a particle size of about 200 μm to about 1,000 μm, and wherein the one or more thermoplastics comprise one or more homopolymers, one or more copolymers, or any mixture thereof.

92. A blended composition comprising one or more thermoplastics, one or more organic fillers, and one or more pigments, wherein the blended composition has a granite-like appearance, wherein the blended composition comprises about 5 wt % to about 30 wt % of the organic filler based on the combined weight of the thermoplastic and the organic filler, wherein about 2% to about 50% of the organic filler has a particle size of about 200 μm to about 1,000 μm, and wherein the one or more thermoplastics comprise one or more homopolymers, one or more copolymers, or any mixture thereof.

93. A blended composition comprising one or more thermoplastics, one or more organic fillers, and one or more pigments, wherein the blended composition has a granite-like appearance, wherein the blended composition comprises about 5 wt % to about 30 wt % of the organic filler based on the combined weight of the thermoplastic and the organic filler, wherein the organic filler comprises about 60 wt % to about 80 wt % particles having a size of less than about 100 μm and about 20 wt % to about 40 wt % of particles having a size of about 100 μm to about 1,000 μm, and wherein the one or more thermoplastics comprise one or more homopolymers, one or more copolymers, or any mixture thereof.

94. The blended composition according to any one of paragraphs 88 to 93, wherein the one or more thermoplastics comprise a blend of a polypropylene homopolymer and a copolymer of propylene and one or more comonomers selected from the group consisting of: ethylene and $C_4$ to $C_{20}$ olefins.

95. The blended composition according to any one of paragraphs 88 to 94, wherein the blended composition comprises about 0.5 wt % to about 5 wt % of the one or more pigments based on the combined weight of the thermoplastic, the organic filler, and the pigment.

96. The blended composition according to any one of paragraphs 88 to 95, wherein the blended composition comprises about 5 wt % to about 30 wt % of the organic filler based on the combined weight of the thermoplastic and the organic filler.

97. A blended composition comprising one or more thermoplastic copolymers, one or more organic fillers, and one or more pigments, wherein the blended composition has a granite-like appearance.

98. A blended composition comprising one or more thermoplastic copolymers, one or more organic fillers, and one or more pigments, wherein the blended composition is a counter top.

99. A blended composition comprising one or more thermoplastic copolymers, one or more organic fillers, and one or more pigments, wherein the blended composition has a granite-like appearance, and wherein the blended composition is a counter top.

100. A blended composition comprising one or more thermoplastic copolymers, one or more organic fillers, and one or more pigments, wherein the blended composition comprises about 5 wt % to about 30 wt % of the organic filler based on the combined weight of the thermoplastic copolymer and the organic filler, and wherein about 2% to about 50% of the organic filler has a particle size of about 200 µm to about 1,000 µm.

101. A blended composition comprising one or more thermoplastic copolymers, one or more organic fillers, and one or more pigments, wherein the blended composition has a granite-like appearance, wherein the blended composition comprises about 5 wt % to about 30 wt % of the organic filler based on the combined weight of the thermoplastic copolymer and the organic filler, and wherein about 2% to about 50% of the organic filler has a particle size of about 200 µm to about 1,000 µm.

102. A blended composition comprising one or more thermoplastic copolymers, one or more organic fillers, and one or more pigments, wherein the blended composition has a granite-like appearance, wherein the blended composition comprises about 5 wt % to about 30 wt % of the organic filler based on the combined weight of the thermoplastic copolymer and the organic filler, and wherein the organic filler comprises about 60 wt % to about 80 wt % particles having a size of less than about 100 µm and about 20 wt % to about 40 wt % of particles having a size of about 100 µm to about 1,000 µm.

103. The blended composition according to any one of paragraphs 97 to 102, wherein the thermoplastic copolymer comprises a blend of a polypropylene homopolymer and a copolymer of propylene and one or more comonomers selected from the group consisting of: ethylene and $C_4$ to $C_{20}$ olefins.

104. The blended composition according to paragraph 103, wherein the comonomer is present in an amount of about 10 wt % to about 40 wt % based on the weight of the thermoplastic copolymer.

105. The blended composition according to any one of paragraphs 97 to 104, wherein the blended composition comprises about 0.5 wt % to about 5 wt % of the one or more pigments based on the combined weight of the thermoplastic copolymer, the organic filler, and the pigment.

106. The blended composition according to any one of paragraphs 97 to 105, wherein the blended composition comprises about 5 wt % to about 30 wt % of the organic filler based on the combined weight of the thermoplastic copolymer and the organic filler.

107. The blended composition according to any one of paragraphs 97 to 106, wherein the blended composition has a Notched Izod Impact Strength of at least 20 J/m to about 600 J/m as measured according to ASTM D256-10.

108. The blended composition according to any one of paragraphs 97 to 107, wherein the blended composition has a melt index of about 1 g/10 min to about 100 g/10 min as measured according to ASTM D1238-13, procedure B (at 230° C. and 2.16 kg weight).

109. A counter top, comprising: a blended composition comprising one or more thermoplastics, one or more organic fillers, and one or more pigments, wherein the blended composition has a granite-like appearance, and wherein the one or more thermoplastics comprise one or more homopolymers, one or more copolymers, or any mixture thereof.

110. A counter top, comprising: a blended composition comprising one or more thermoplastics, one or more organic fillers, and one or more pigments, wherein the blended composition has a granite-like appearance, wherein the blended composition comprises about 5 wt % to about 30 wt % of the organic filler based on the combined weight of the thermoplastic and the organic filler, wherein about 2% to about 50% of the organic filler has a particle size of about 200 µm to about 1,000 µm, and wherein the one or more thermoplastics comprise one or more homopolymers, one or more copolymers, or any mixture thereof.

111. A counter top, comprising: a blended composition comprising one or more thermoplastics, one or more organic fillers, and one or more pigments, wherein the blended composition has a granite-like appearance, wherein the blended composition comprises about 5 wt % to about 30 wt % of the organic filler based on the combined weight of the thermoplastic and the organic filler, wherein the organic filler comprises about 60 wt % to about 80 wt % particles having a size of less than about 100 µm and about 20 wt % to about 40 wt % of particles having a size of about 100 µm to about 1,000 µm, and wherein the one or more thermoplastics comprise one or more homopolymers, one or more copolymers, or any mixture thereof.

112. The counter top according to any one of paragraphs 109 to 111, wherein the one or more thermoplastics comprise a blend of a polypropylene homopolymer and a copolymer of propylene and one or more comonomers selected from the group consisting of: ethylene and $C_4$ to $C_{20}$ olefins.

113. The counter top according to any one of paragraphs 109 to 112, wherein the blended composition comprises about 0.5 wt % to about 5 wt % of the one or more pigments based on the combined weight of the thermoplastic, the organic filler, and the pigment.

114. The counter top according to any one of paragraphs 109 to 113, wherein the blended composition comprises about 5 wt % to about 30 wt % of the organic filler based on the combined weight of the thermoplastic and the organic filler.

115. The counter top according to any one of paragraphs 109 to 114, wherein the comonomer is present in an amount of about 10 wt % to about 40 wt % based on the weight of the thermoplastic copolymer.

116. The counter top according to any one of paragraphs 109 to 115, wherein the blended composition comprises about 0.5 wt % to about 5 wt % of the one or more pigments based on the combined weight of the thermoplastic copolymer, the organic filler, and the pigment.

117. The counter top according to any one of paragraphs 109 to 116, wherein the blended composition has a Notched Izod Impact Strength of at least 20 J/m to about 600 J/m as measured according to ASTM D256-10, and wherein the blended composition has a melt index of about 1 g/10 min to about 100 g/10 min as measured according to ASTM D1238-13, procedure B (at 230° C. and 2.16 kg weight).

118. A blended composition, comprising a thermoplastic copolymer and a filler, the blended composition having a Notched Izod Impact Strength of at least 20 J/m to about 600 J/m, as measured according to ASTM D256-10, and a melt index of about 1 g/10 min to about 100 g/10 min, as measured according to ASTM D1238-13, procedure B (at 230° C. and 2.16 kg weight), wherein: the thermoplastic copolymer comprises a blend of a polypropylene homopolymer and a copolymer of propylene and a comonomer, the comonomer comprises ethylene, a $C_4$ to $C_{20}$ olefin, or any mixture thereof, the thermoplastic copolymer comprises about 0.5 wt % to about 40 wt % of the comonomer, based on the combined weight of the polypropylene homopolymer and the copolymer of propylene and the comonomer, the filler comprises an organic filler and an inorganic filler, and the blended composition comprises about 5 wt % to about 30 wt % of the filler based on the combined weight of the thermoplastic copolymer and the filler.

119. The blended composition according to paragraph 118, wherein the organic filler comprises rice husk.

120. The blended composition according to paragraph 118 or 119, wherein the inorganic filler comprises one or more inorganic oxides, carbon, one or more inorganic carbonates, one or more silicates, or any mixture thereof.

121. The blended composition according to any one of paragraphs 118 to 120, wherein the filler comprises at least 1 wt %, at least 3 wt %, at least 5 wt %, at least 7 wt %, or at least 10 wt % and up to about 15 wt %, about 20 wt %, 25 wt %, about 27 wt %, or about 29 wt % of the organic filler, based on the combined weight of the thermoplastic copolymer, the organic filler, and the inorganic filler.

122. The blended composition according to any one of paragraphs 118 to 121, wherein the filler comprises at least 1 wt %, at least 3 wt %, at least 5 wt %, at least 7 wt %, or at least 10 wt % and up to about 15 wt %, about 20 wt %, 25 wt %, about 27 wt %, or about 29 wt % of the inorganic filler, based on the combined weight of the thermoplastic copolymer, the organic filler, and the inorganic filler.

123. The blended composition according to any one of paragraphs 118 to 122, wherein the thermoplastic copolymer comprises about 0.5 wt % to about 9.9 wt % of the comonomer, based on the combined weight of the polypropylene homopolymer and the copolymer of propylene and the comonomer.

124. The blended composition according to any one of paragraphs 118 to 123, wherein the thermoplastic copolymer comprises at least 10 wt % to about 20 wt % of the comonomer, based on the combined weight of the polypropylene homopolymer and the copolymer of propylene and the comonomer.

125. The blended composition according to any one of paragraphs 118 to 123, wherein the thermoplastic copolymer comprises greater than 20 wt % to about 40 wt % of the comonomer, based on the combined weight of the polypropylene homopolymer and the copolymer of propylene and the comonomer.

126. The blended composition according to any one of paragraphs 118 to 125, wherein the comonomer comprises ethylene.

127. The blended composition according to any one of paragraphs 118 to 126, wherein the blended composition further comprises one or more fragrances, one or more pigments, or any combination thereof.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A blended composition, comprising a thermoplastic copolymer and an organic filler, the blended composition having a Notched Izod Impact Strength of at least 20 J/m to about 600 J/m, as measured according to ASTM D256-10, a melt index of about 1 g/10 min to about 100 g/10 min, as measured according to ASTM D1238-13, procedure B (at 230° C. and 2.16 kg weight), and a present gloss at 60° of at least 5, as measured according to ASTM D523-14, wherein:
   the thermoplastic copolymer comprises a blend of a polypropylene homopolymer and a copolymer of propylene and a comonomer,
   the comonomer comprises ethylene, a $C_4$ to $C_{20}$ olefin, or any mixture thereof,
   the copolymer of propylene and the comonomer comprises a random copolymer comprising about 0.5 wt % to about 6 wt % of the comonomer or a polyolefin elastomer comprising greater than 18 wt % to about 40 wt % of the comonomer,
   the organic filler comprises rice husk having a particle size of about 0.1 micron to about 1,000 microns, and
   the blended composition comprises about 5 wt % to about 30 wt % of the organic filler based on the combined weight of the thermoplastic copolymer and the organic filler.

2. The composition of claim 1, wherein the rice husk has a particle size of about 50 microns to about 500 microns.

3. The composition of claim 1, wherein the blended composition has a melt index of greater than 7 g/10 min to about 70 g/10 min, as measured according to ASTM D1238-13, procedure B (at 230° C. and 2.16 kg weight) a Notched Izod Impact Strength of at least 26.7 J/m to about 450 J/m, as measured according to ASTM D256-10, and a percent gloss at 60° of about 15 to about 70, as measured according to ASTM D523-14.

4. The composition of claim 1, wherein the blended composition has a melt index of greater than 10 g/10 min to about 50 g/10 min, as measured according to ASTM D1238-13, procedure B (at 230° C. and 2.16 kg weight), a Notched Izod Impact Strength of at least 30 J/m to about 450 J/m, as measured according to ASTM D256-10, and a percent gloss at 60° of about 20 to about 70, as measured according to ASTM D523-14.

5. The composition of claim 1, wherein the thermoplastic copolymer comprises about 5 wt % to about 40 wt % of the copolymer of propylene and the comonomer, based on the combined weight of the polypropylene homopolymer and the copolymer of propylene and the comonomer, and wherein the blended composition has a percent gloss at 60° of at least 50 to about 70, as measured according to ASTM D523-14.

6. The composition of claim 1, wherein the copolymer of propylene and the comonomer comprises the random copolymer, and wherein the thermoplastic copolymer comprises 21.5 wt % to about 40 wt % of the copolymer of propylene and the comonomer, based on the combined weight of the polypropylene homopolymer and the copolymer of propylene and the comonomer.

7. The composition of claim 1, wherein
   the thermoplastic copolymer further comprises a second copolymer of propylene and a second comonomer,
   the second comonomer comprises ethylene, a $C_4$ to $C_{20}$ olefin, or any mixture thereof, and
   the second copolymer of propylene and the second comonomer comprises an impact copolymer comprising at least 6.1 wt % to 18 wt % of the second comonomer.

8. The composition of claim 1, wherein the copolymer of propylene and the comonomer comprises the polyolefin elastomer, and wherein the thermoplastic copolymer comprises 21.5 wt % to about 40 wt % of the copolymer of propylene and the comonomer, based on the combined weight of the polypropylene homopolymer and the copolymer of propylene and the comonomer.

9. The composition of claim 1, wherein about 60 wt % to about 80 wt % of the organic filler has a particle size of less than about 100 μm and about 20 wt % to about 40 wt % of the organic filler has an particle size of about 100 μm to about 1,000 μm.

10. The composition of claim 1, wherein the blended composition further comprises a fragrance, wherein the fragrance comprises mint concentrate, lemon concentrate, lime concentrate, orange concentrate, vanilla concentrate, coffee, or any mixture thereof, and wherein the blended composition comprises about 0.005 wt % to about 1 wt % of the fragrance, based on the combined weight of the thermoplastic copolymer, the organic filler, and the fragrance.

11. The composition of claim 1, wherein the blended composition further comprises a pigment, wherein the pigment comprises titanium dioxide, calcium carbonate, zinc oxide, talc, kaolin, wollastonite, or any mixture thereof, and wherein the blended composition comprises about 0.5 wt % to about 20 wt % of the pigment, based on the combined weight of the thermoplastic copolymer, the organic filler, and the pigment.

12. The composition of claim 1, wherein:
the blended composition has a melt index of greater than 10 g/10 min to about 70 g/10 min, as measured according to ASTM D1238-13, procedure B (at 230° C. and 2.16 kg weight),
the blended composition has a Notched Izod Impact Strength of at least 26.7 J/m to about 450 J/m, as measured according to ASTM D256-10, and
the thermoplastic copolymer comprises about 8 wt % to about 30 wt % of the copolymer of propylene and the comonomer, based on the combined weight of the polypropylene homopolymer and the copolymer of propylene and the comonomer.

13. The composition of claim 1, wherein:
about 60 wt % to about 80 wt % of the organic filler has a particle size of less than about 100 μm and about 20 wt % to about 40 wt % of the organic filler has a particle size of about 100 μm to about 1,000 μm,
the comonomer comprises ethylene,
the blended composition has a melt index of greater than 19 g/10 min to about 55 g/10 min, as measured according to ASTM D1238-13, procedure B (at 230° C. and 2.16 kg weight),
the blended composition has a Notched Izod Impact Strength of at least 30 J/m to about 450 J/m, as measured according to ASTM D256-10, and
the thermoplastic copolymer comprises about 8 wt % to about 25 wt % of the copolymer of propylene and the comonomer, based on the combined weight of the polypropylene homopolymer and the copolymer of propylene and the comonomer.

14. A method for making a blended composition, comprising:
blending a first thermoplastic copolymer with a concentrated blend at a temperature of less than 185° C. to produce a blended composition having a Notched Izod Impact Strength of at least 20 J/m to about 600 J/m, as measured according to ASTM D256-10, a melt index of about 1 g/10 min to about 100 g/10 min, as measured according to ASTM D1238-13, procedure B (at 230° C. and 2.16 kg weight), and a percent gloss at 60° of at least 5, as measured according to ASTM D523-14, wherein:

the first thermoplastic copolymer comprises a blend of a first polypropylene homopolymer and a first copolymer of propylene and a first comonomer,
the first comonomer comprises ethylene, a $C_4$ to $C_{20}$ olefin, or any mixture thereof,
the first copolymer of propylene and the first comonomer comprises about 0.5 wt % to about 40 wt % of the first comonomer,
the concentrated blend comprises:
(1) a second thermoplastic copolymer and greater than 30 wt % to about 55 wt % of an organic filler comprising rice husk, based on the combined weight of the second thermoplastic copolymer and the organic filler,
(2) a second polypropylene homopolymer and greater than 30 wt % to about 55 wt % of an organic filler comprising rice husk, based on the combined weight of the second polypropylene homopolymer and the organic filler, or
(3) a second thermoplastic copolymer, a second polypropylene homopolymer, and greater than 30 wt % to about 55 wt % of an organic filler comprising rice husk, based on the combined weight of the second thermoplastic copolymer, the second polypropylene homopolymer, and the organic filler, and
wherein the blended composition comprises about 5 wt % to about 30 wt % of the organic filler, based on the combined weight of the first thermoplastic copolymer and the concentrated blend.

15. The method of claim 14, wherein the first thermoplastic copolymer is blended with the concentrated blend at a temperature of less than 180° C.

16. The method of claim 14, wherein:
the first thermoplastic copolymer is blended with the concentrated blend at a temperature of less than 180° C.,
the blended composition has a melt index of greater than 10 g/10 min to about 70 g/10 min, as measured according to ASTM D1238-13, procedure B (at 230° C. and 2.16 kg weight),
the blended composition has a Notched Izod Impact Strength of at least 26.7 J/m to about 450 J/m, as measured according to ASTM D256-10, and
the blended composition has a percent gloss at 60° of about 20 to about 70, as measured according to ASTM D523-14.

17. The method of claim 14, wherein the concentrated blend has a Notched Izod Impact Strength of at least 10 J/m to about 300 J/m, as measured according to ASTM D256-10, and a melt index of about 5 g/10 min to about 100 g/10 min, as measured according to ASTM D1238-13, procedure B (at 230° C. and 2.16 kg weight), wherein the concentrated blend comprises the second thermoplastic copolymer, wherein the second thermoplastic copolymer comprises a copolymer of propylene and a second comonomer, wherein the second comonomer comprises ethylene, a $C_4$ to $C_{20}$ olefin, or any mixture thereof, and wherein the second copolymer of propylene and the second comonomer comprises a random copolymer comprising about 0.5 wt % to about 6 wt % of the second comonomer.

18. A concentrated blend comprising a thermoplastic copolymer and an organic filler, the concentrated blend having a Notched Izod Impact Strength of at least 10 J/m to about 300 J/m, as measured according to ASTM D256-10, a melt index of about 5 g/10 min to about 100 g/10 min, as measured according to ASTM D1238-13, procedure B (at 230° C. and 2.16 kg weight), and a percent gloss at 60° of about 10 to about 80, as measured according to ASTM D523-14, wherein:

the thermoplastic copolymer comprises:
- (A) a blend of a polypropylene homopolymer and a first copolymer of propylene and a first comonomer, wherein the first comonomer comprises ethylene, a $C_4$ to $C_{20}$ olefin, or any mixture thereof, and wherein the first copolymer comprises a random copolymer comprising about 0.5 wt % to about 6 wt % of the first comonomer or a polyolefin elastomer comprising greater than 18 wt % to about 40 wt % of the first comonomer, or
- (B) a second copolymer of propylene and a second comonomer, wherein the second comonomer comprises ethylene, a $C_4$ to $C_{20}$ olefin, or any mixture thereof, and wherein the second copolymer comprises a random copolymer comprising about 0.5 wt % to about 6 wt % of the second comonomer, the organic filler comprises rice husk having a particle size of about 0.1 micron to about 1,000 microns, and the concentrated blend comprises at least 30 wt % to about 55 wt % of the organic filler, based on the combined weight of the thermoplastic copolymer and the organic filler.

19. The concentrated blend of claim 18, wherein the rice husk has a particular size of about 50 microns to about 500 microns, and wherein the thermoplastic copolymer comprises the blend of the polypropylene homopolymer and the first copolymer of propylene and the first comonomer, and wherein the first copolymer comprises greater than 18 wt % to about 40 wt % of the first comonomer.

20. The concentrated blend of claim 18, wherein the thermoplastic copolymer comprises the second copolymer.

* * * * *